| FIG. 8 | FIG. 9 | FIG. 10 | FIG. 11 |

United States Patent Office
3,399,342
Patented Aug. 27, 1968

1

3,399,342
AUTOMATIC HIGH VOLTAGE INSULATION CABLE TEST SET FOR TESTING MULTIPLE CONDUCTOR METAL SHEATHED ELECTRICAL CABLES
Harry Fligel, St. Laurent, Quebec, Canada, assignor to Northern Electric Company Limited, Montreal, Quebec, Canada
Filed Jan. 19, 1966, Ser. No. 521,568
Claims priority, application Canada, June 29, 1965, 934,597
6 Claims. (Cl. 324—54)

ABSTRACT OF THE DISCLOSURE

An automatic test set for carrying out high voltage insulation testing on multiple conductor metal sheathed electrical cables is disclosed provided with a variable source of high voltage having a current control network connected with the variable voltage control to limit the maximum current from the high voltage supply to its design maximum. Fault sensing and indicating circuits are included as well as circuits to prevent conductor charging currents from being recorded as "Faults." The tester will automatically test and record "Faults" on all conductors connected to its test terminals without stopping when a fault is located.

---

Figure 1:
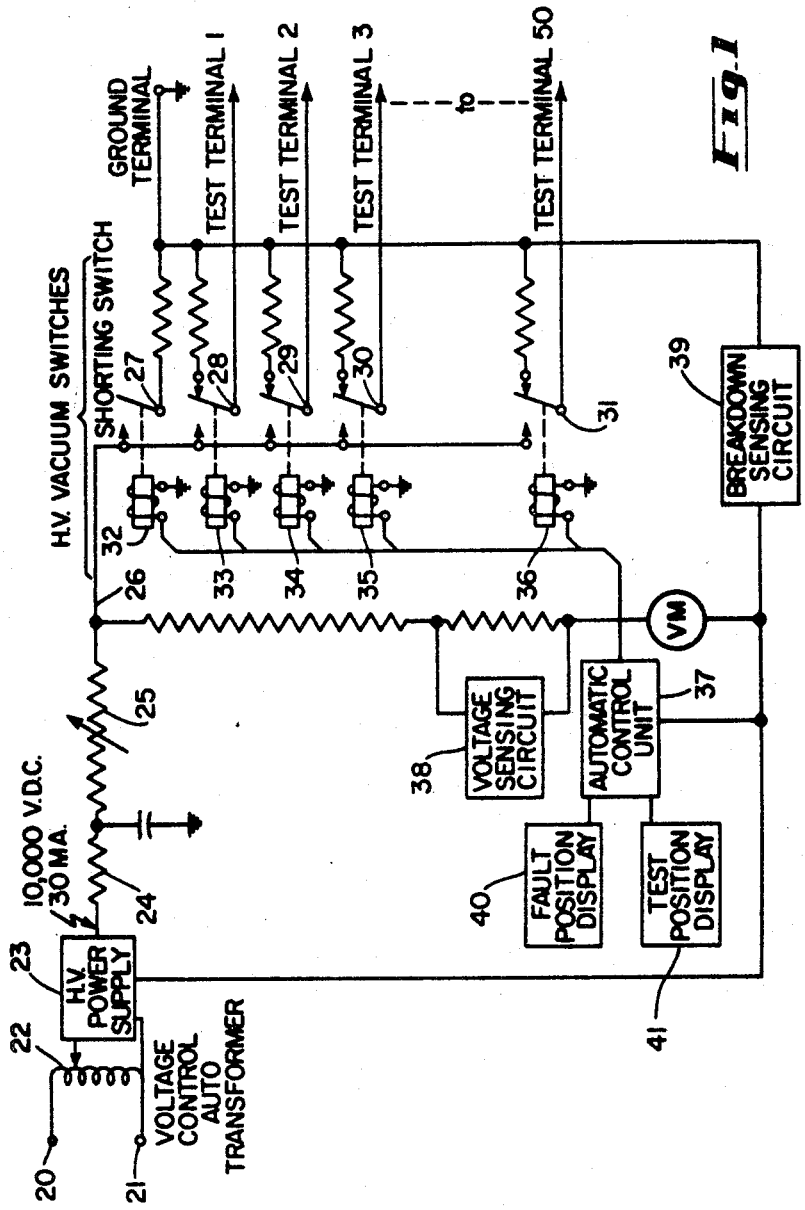

The present invention relates to apparatus for automatically testing the dielectric strength of the insulation in electrical cables containing a large number of individual insulated conductors, and in particular the present invention relates to an automatic tester for polyethylene insulated telephone cables.

The vital part of the telephone system is the cable used to connect the telephone of a subscriber to the switching equipment in a telephone central office and for providing connections between central offices in metropolitan areas. This cable consists of numerous twisted pairs of conductors—up to 2727 pairs.

Prior to World War II, telephone cable conductors were insulated with spirally applied paper tape, or paper pulp. A major breakthrough in cable design occurred with the development of polyethylene and its application to telephone cable conductor insulation.

The test requirements for the dielectric strength of paper insulated conductors, called for 300 to 500 volts A.C. on a sampling basis. This greatly reduced the number of individual conductors to be tested, and a relatively slow A.C. tester with manual switching could be used.

To ensure that the superior quality inherent in polyethylene insulation is maintained, the specification requirements for dielectric testing were drastically upgraded. The test voltage was increased to a range of 3,000 to 10,000 volts D.C. depending on the conductor gauge. The sampling method was scrapped for a 100 percent test. A limited number of high voltage breakdowns are allowed, but no breakdown from any conductor in the cable, to the metallic sheath is tolerated. Each conductor, in the cable, has to be tested against each other as well as against the metallic sheath at high voltage; a formidable job with conventional high voltage testers, considering the large number of conductors that may be included in the cable.

The present invention provides an automatic cable test set for testing the dielectric strength of the insulation in polyethylene insulated cables which meets the above testing specifications. Further the automatic test set of the present invention provides a much less expensive means for testing cable dielectric strength than by the use of a conventional high voltage tester.

2

In general the use of the automatic test set in accordance with the present invention involves the following steps:

(1) The operator sets up the test voltage manually in accordance with the test specification.

(2) The test procedure is initiated by a push-button and proceeds automatically through all the test positions.

(3) At each test position, the ground is removed from the conductors connected to it and the voltage is applied. When the specified test voltage is reached it would remain on the conductors for the required test period (one second). At the end of the test period, the voltage is removed and the conductors are replaced on ground, allowing them to discharge. After a discharge interval, the set steps to the next position and repeats the procedure.

(4) When a breakdown is encountered, the voltage is removed, the set steps to the next position and continues testing. However an indication of the identity of the terminal in which the fault is found is retained.

(5) After the last position has been tested, the set will automatically return to its initial start position.

The test set of the present invention is capable of differentiating between conductor-to-conductor breakdown and conductor-to-sheath breakdown. Similarly the test set of the present invention is capable of stepping immediately to any faulted position for re-testing. Retesting is necessary after a cable has automatically been tested in order to determine whether a voltage breakdown has occurred and whether the breakdown is between a conductor in the cable and the sheath. Other than fanning out of the wires to the test terminals, programming the test set and pressing the start button, and retesting faulty wires, the test set is completely automatic. Accordingly it is entirely feasible for one operator to look after more than one of these automatic cable testers in a production operation.

Figure 2:
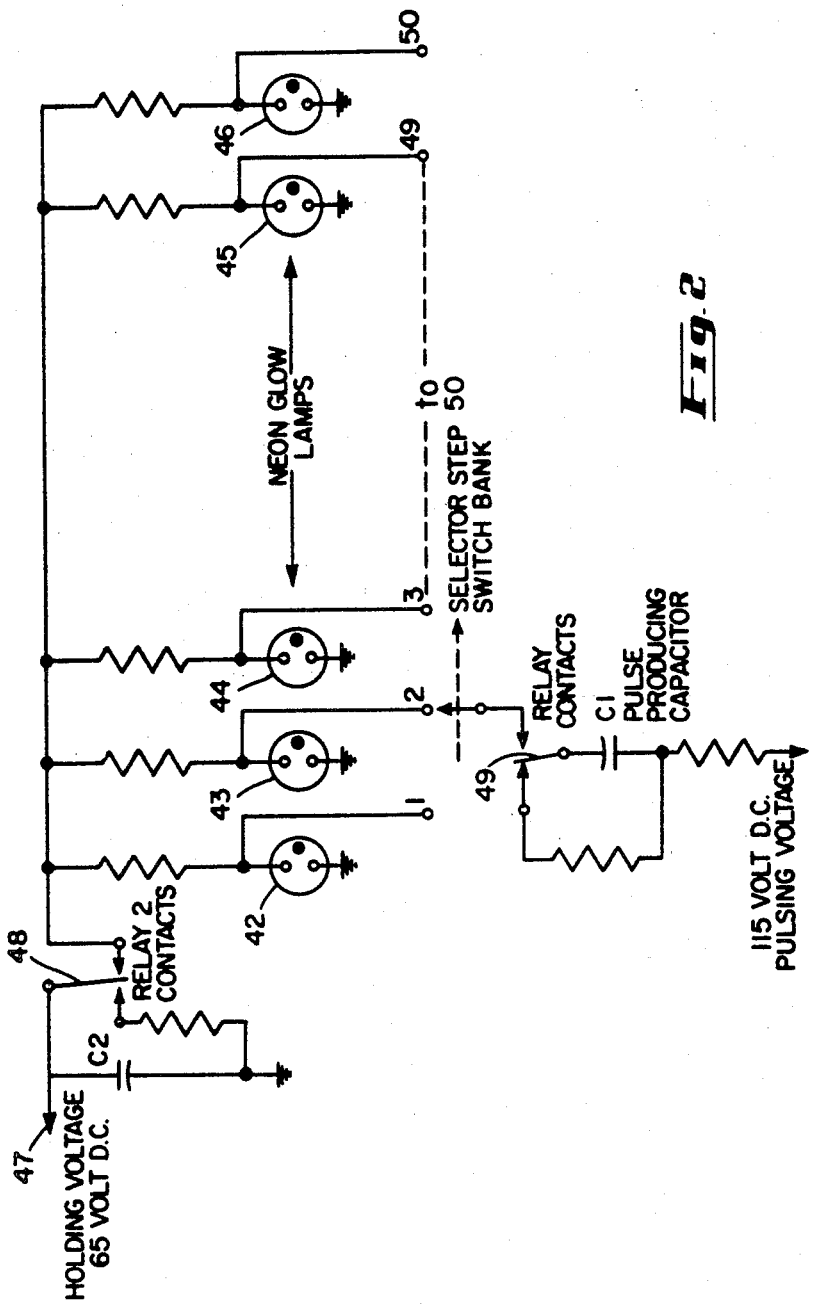
Figure 3:
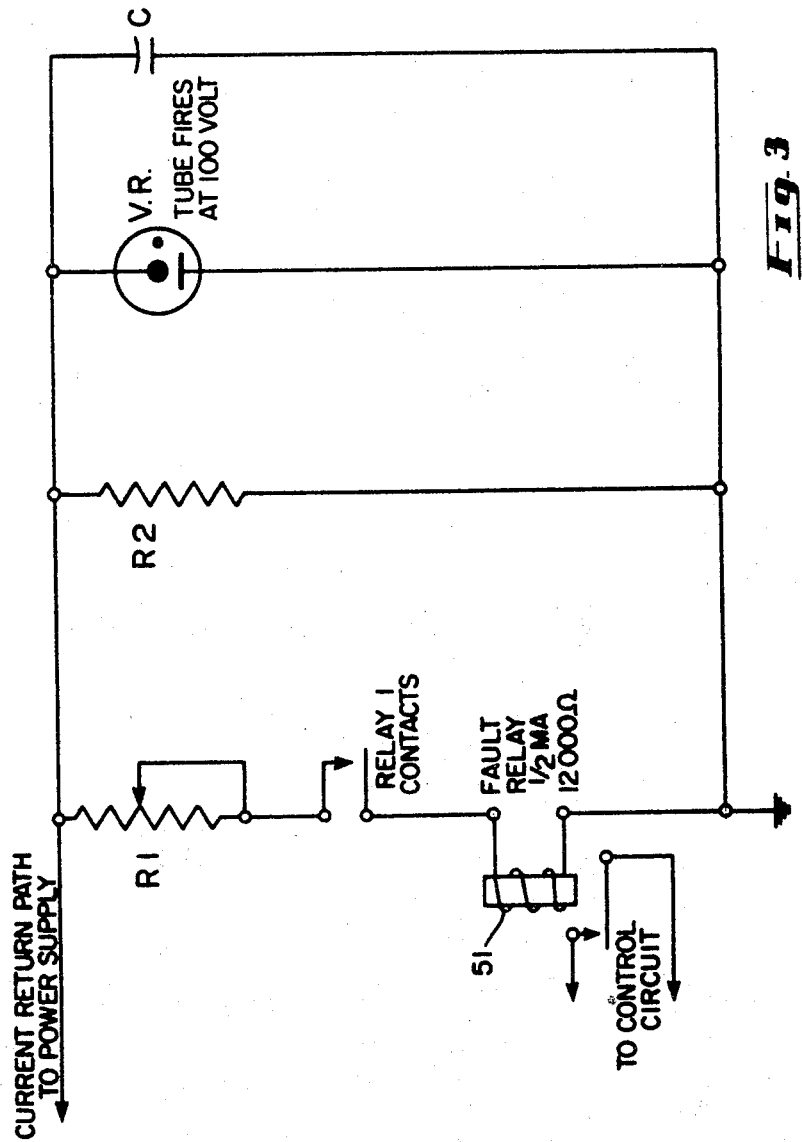
Figure 4:
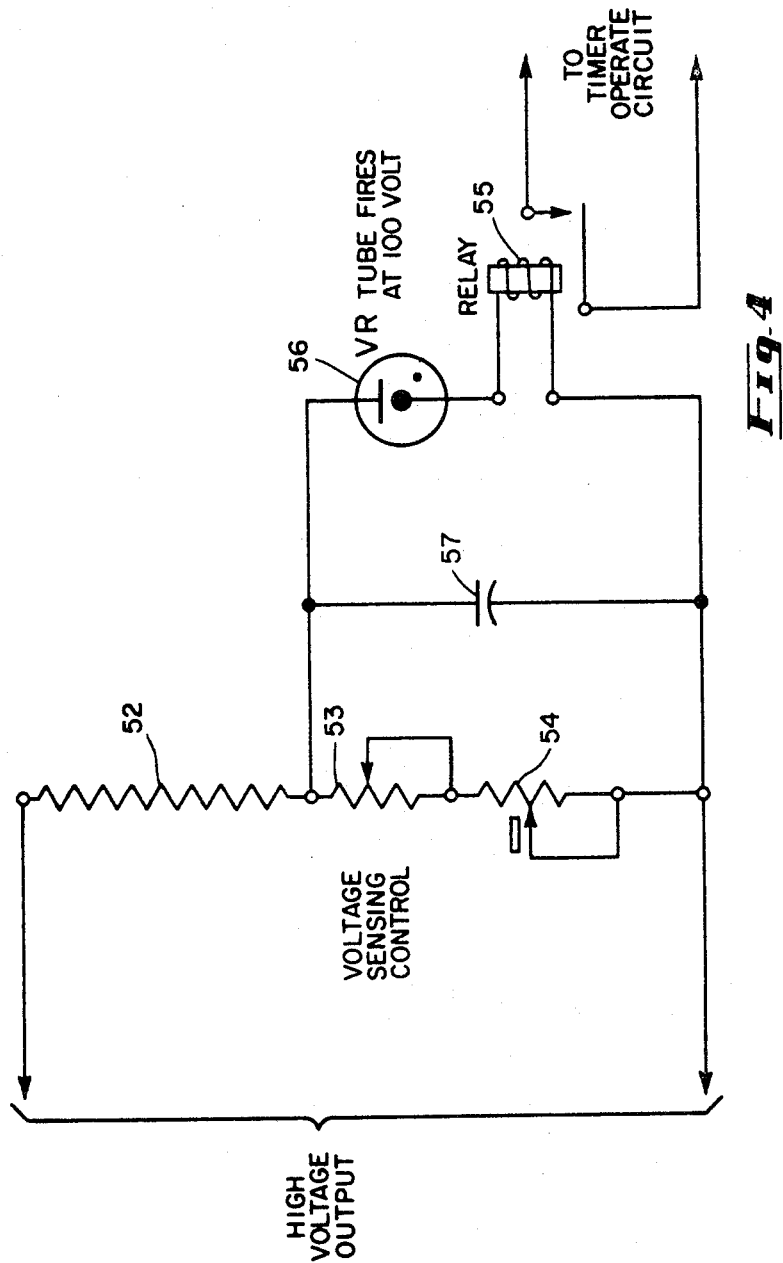
Figure 5:
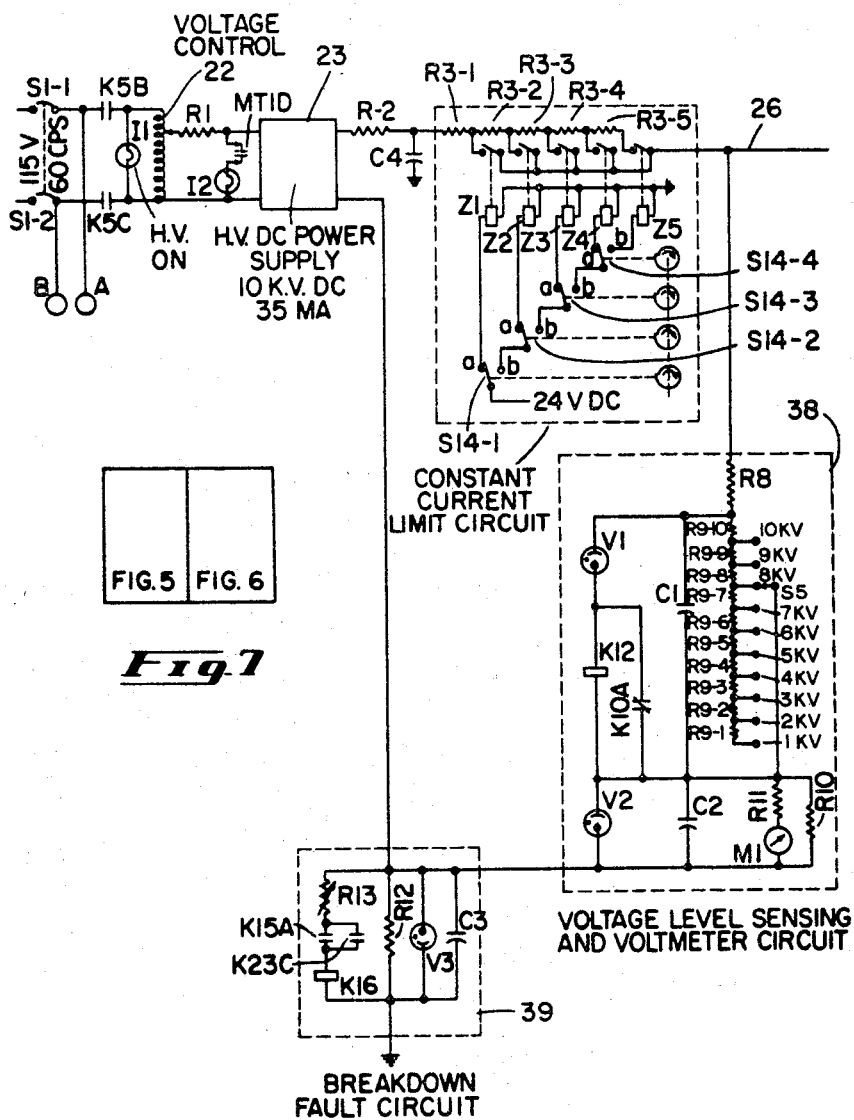
Figure 6:
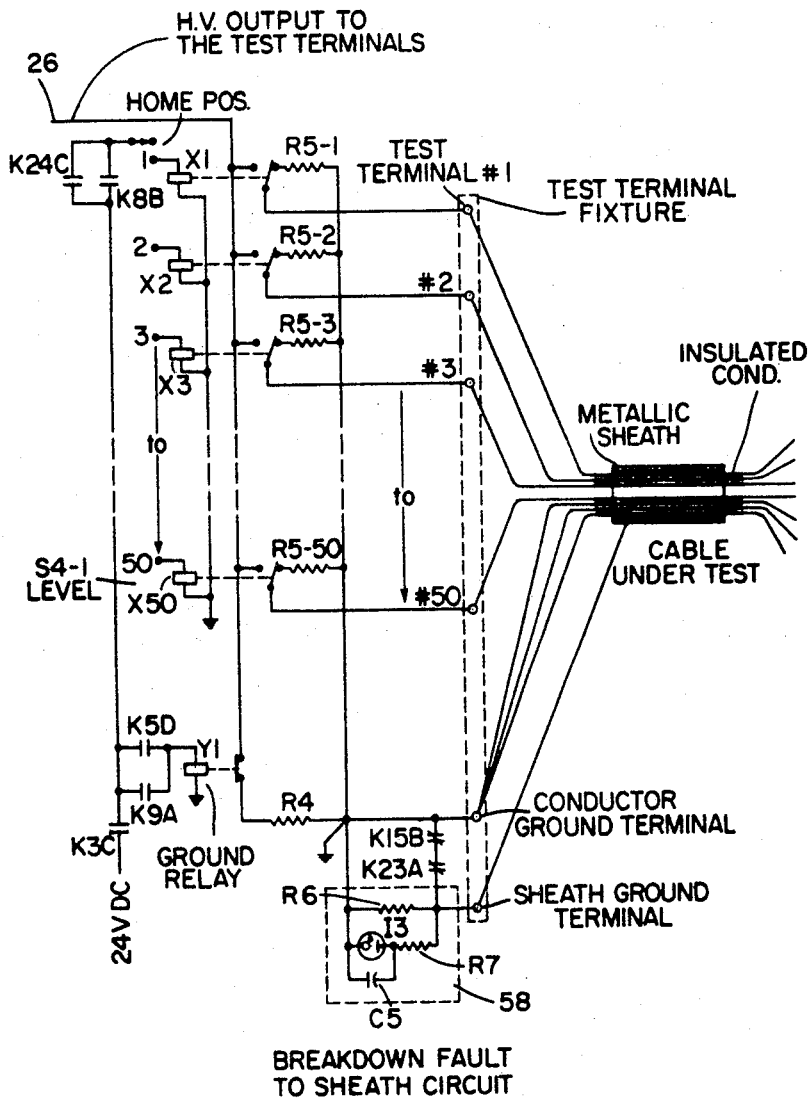
Figure 8:
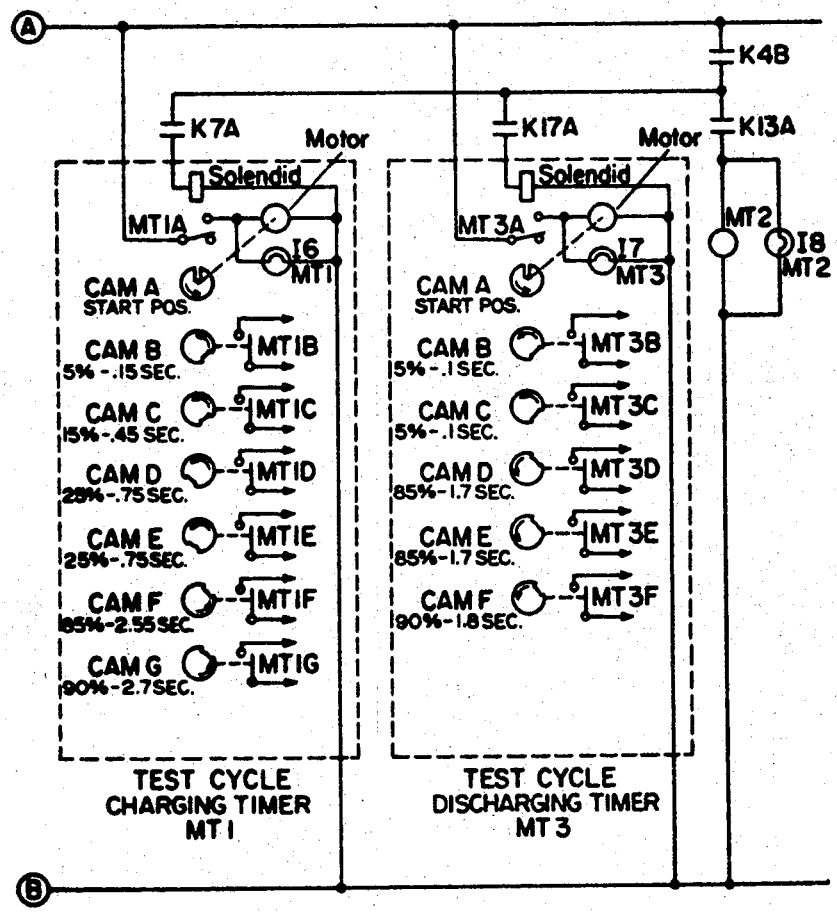
Figure 12:
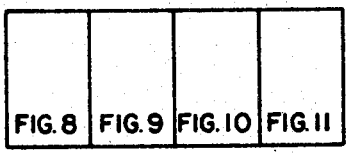
Figure 13:
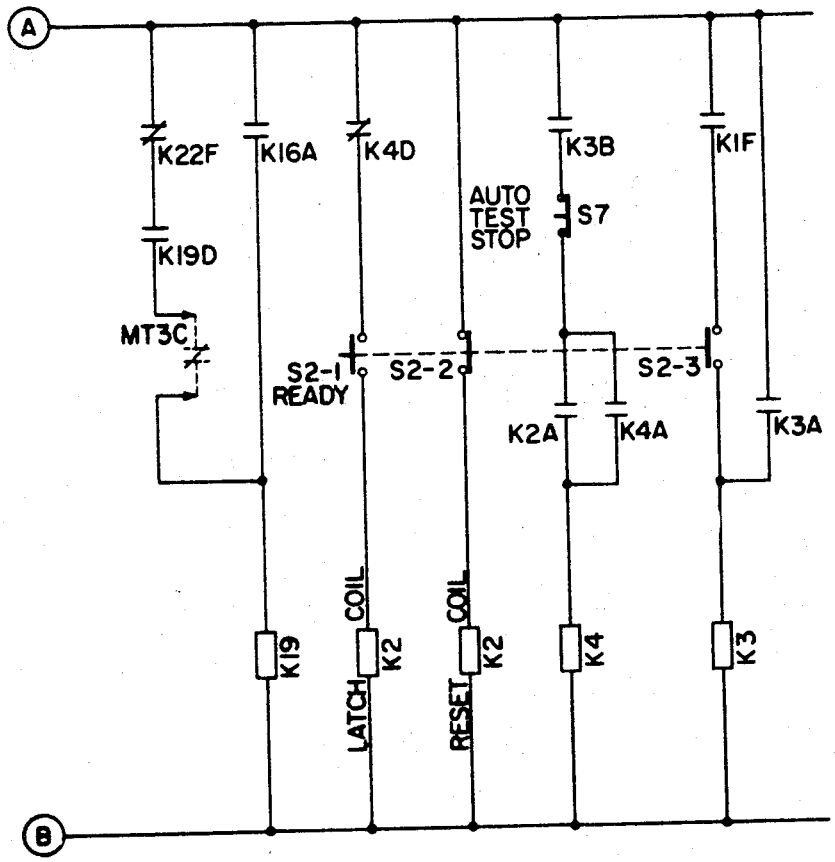

In drawings which illustrate the principles of the present invention and a complete embodiment of an automatic tester constructed in accordance with the present invention, FIGURE 1 is a block diagram partially schematic in form illustrating the overall structure of an automatic test set in accordance with the present invention, FIGURE 2 is a schematic diagram of the fault memory circuit or fault position display of FIGURE 1, FIGURE 3 is the schematic diagram of the breakdown sensing circuit shown in block diagram form in FIGURE 1, FIGURE 4 is a schematic diagram of the voltage sensing circuit of FIGURE 1, FIGURES 5 and 6 are a simplified schematic diagram of an automatic cable tester constructed in accordance with the present invention, FIGURE 7 shows the relationship of FIGURES 5 and 6, FIGURES 8, 9, 10 and 11 are a schematic diagram of some of the control circuits associated with the test equipment of FIGURES 5 and 6 which connect to terminals A and B of FIGURE 5, FIGURE 12 illustrates the relationship of FIGURES 8, 9, 10 and 11, FIGURES 13, 14, 15, 16 and 17 are a schematic diagram of the remaining control circuits of the automatic cable tester of FIGURES 5 and 6, with the terminals A and B of FIGURE 13 connected to the terminals A, and B of FIGURE 5.

Figure 18:
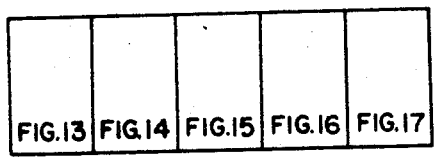
Figure 14:
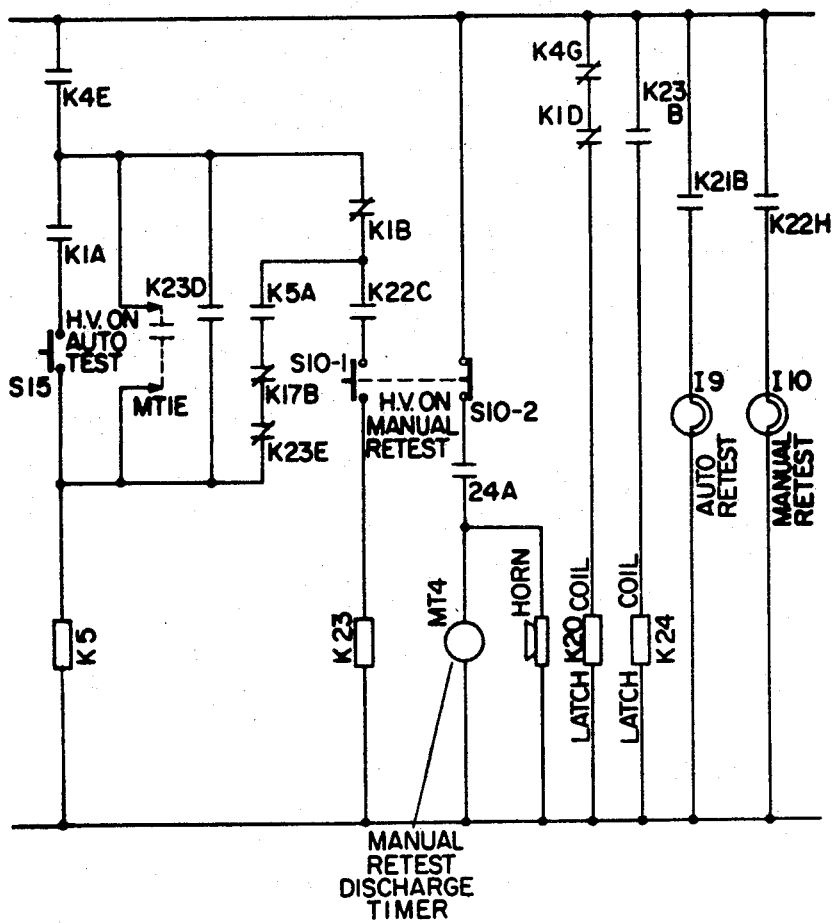
Figure 15:
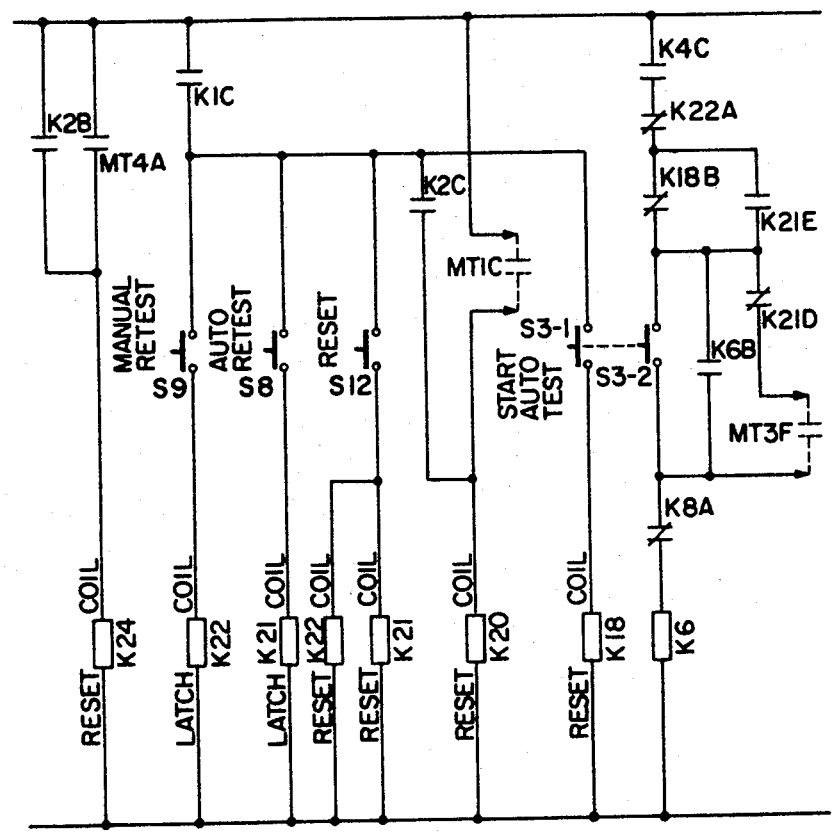
Figure 16:
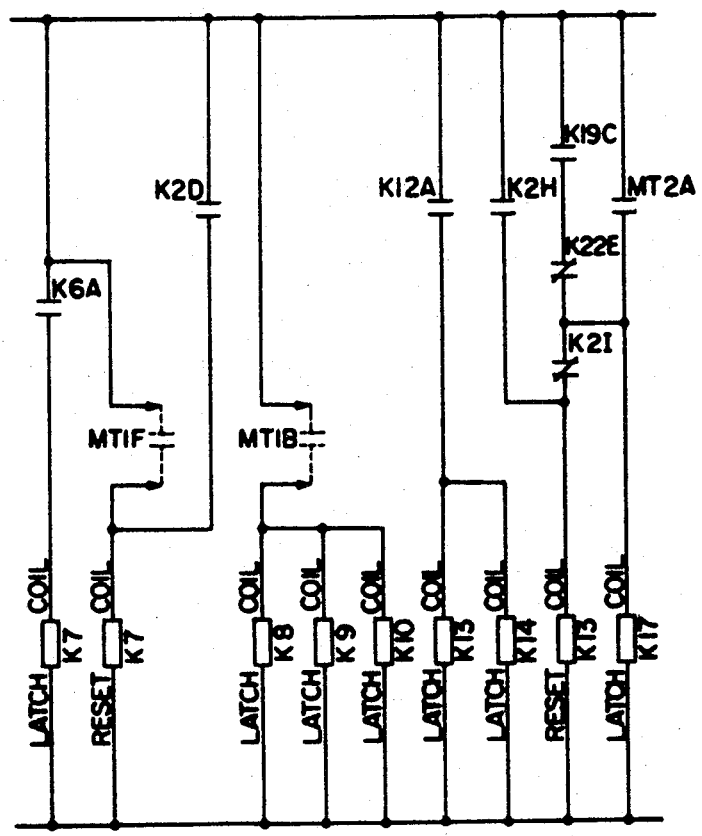
Figure 17:
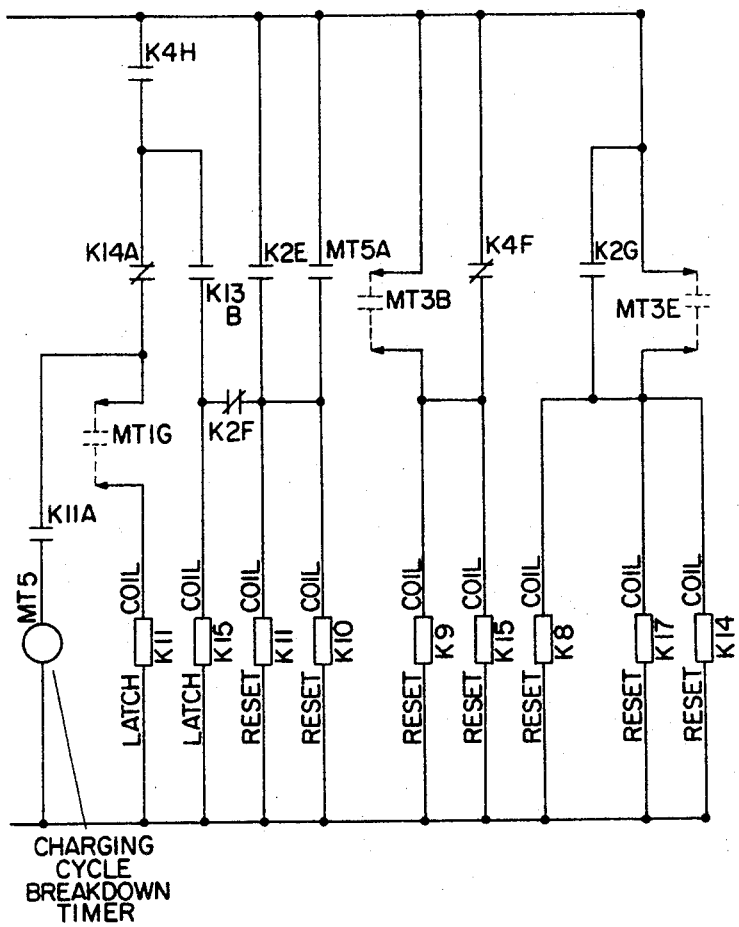

FIGURE 18 shows the relative positions of FIGURES 13, 14, 15, 16 and 17.

Referring to FIGURE 1, there is shown in simplified form a block diagram of an automatic cable tester constructed in accordance with the present invention. A pair of terminals 20 and 21 are provided for connection to an alternating current supply line, and the alternating current from the supply is fed to a voltage control auto-transformer 22 which controls the input voltage to the high voltage power supply 23. As illustrated in FIGURE 1, the output voltage of the high voltage power supply 23 may be as high as 10,000 volts DC at a current of 30 ma. This high voltage output is then connected by a fixed resistor 24 and variable resistor 25 to a high voltage bus 26 which in turn is connected to the fixed terminal of a series of high voltage vacuum switches 27, 28, 29, 30 and 31. Each of the vacuum switches 27 to 31 inclusive is provided with an operating coil 32, 33, 34, 35, and 36 respectively. The operation of operating coils 32 to 36 is in turn controlled by the automatic control unit 37. Switch number 27 is a shorting switch provided to short the high voltage bus 26 to ground so that the high voltage bus may be discharged as required. It will be noted that each of the switches 28 to 31 inclusive is provided with a normally closed contact which serves to short the test terminals associated with the particular switch to ground except when the associated operating coil 33 to 36 is operated. A voltage level sensing circuit 38 is provided which determines when the voltage on the bus 26 has reached the proper level for testing each conductor in the cable. A breakdown sensing circiut 39 is also provided for detecting faults within the cable under test, which faults are recorded and displayed by the fault position display unit 40. Unit 41 provides a display of the position under test at any given point in the operating cycle of the automatic cable tester. As shown in FIGURE 1, the unit is provided with 50 test terminals to which selected groupings of conductors in the cables under test may be connected in order to conduct a voltage breakdown test on the cable. The specified high voltage output from the high voltage power supply 23 is adjusted by the voltage control auto-transformer 22 and automatic testing of each of the cable components connected to the 50 test terminals is commenced under control of the automatic control unit 37. The breakdown sensing circuit 39 will detect all cable faults which are displayed by the fault position display 40. A feature of the cable tester of the present invention is that the automatic tester does not stop when a cable fault is detected, but merely records the position of the fault on the fault display 40 and continues to test the remaining test terminals of the apparatus. At the end of testing, all test terminals at which breakdown faults occurred, will be displayed on the fault position display 40 and retesting of these faulted positions may then be accomplished in accordance with further features of the automatic control unit 37 as will be disclosed hereinafter.

A large part of the operator's time is taken in setting up the cable and connecting the wires to the test terminals on the fanning board. The operator's output could be increased substantially if he could operate two sets at one time. That is, while one set is testing, he could connect another.

With this in mind, a memory circuit is provided which retains the identity of all test terminals where breakdowns have occurred. Thus, it is unnecessary to stop the action of the set when a breakdown occurs. The set can continue to test until all the positions are completed.

In general, neon glow lamps will continue to operate at about 15 volts below their starting voltage. This differential is used to provide a simple, compact, inexpensive memory circuit. FIGURE 2 shows this circuit. It consists of fifty neon glow lamps, 42 to 46, one for each test position. A holding voltage of 65 volts D.C. is applied to all the lamps. The holding voltage is applied to the neon tubes via the terminal 47 and the relay 48. This voltage is about 10 volts below the starting voltage. When a breakdown occurs, relay 49 contacts operate and the lamp associated with this position is pulsed by the capacitor C1, which is charged by a 115 volts D.C. external source. The selector stepping switch 50 connects the contacts of relay 49 to each of the neon glow lamps 42 to 46 in synchronism with testing of the associated terminal of the test terminals. The neon lamp lights when a fault occurs and is maintained by the 65 volt holding voltage. The associated lamp for each test position is selected by a bank of contacts on the selector step switch 50. At the completion of the test, those lamps which are lit display the terminals where breakdowns have occurred. Operation of relay 48 contacts will extinguish the lamps by interrupting the holding voltage. Capacitor C2 is used to eliminate any switching transients which might trigger or extinguish the lamps.

Associated with each of these 50 memory lamps are 50 small lever type switches (not shown in FIGURE 2), which are used to extinguish separately those lamps which indicate breakdown and to step the set rapidly to these positions for retest.

FIGURE 3 is a schematic diagram of the breakdown sensing circuit used to energize the coil 51 of the breakdown relay whose contacts 49 are shown in FIGURE 2. The coil 51 is placed in the current return path to the power supply 23 of FIGURE 1, and the circuit is so arranged that the relay can be made to operate over a wide range of currents such as for example between 3 and 30 ma. by adjusting the potentiometer R1. The resistance R2 is a low value of resistance and is used to shunt most of the fault current around the relay. The voltage regulator tube VR protects the circuit against any high voltage surges and together with capacitor C enables the circuit to respond to a single arc breakdown. The relay 1 contacts place the fault relay in the circuit as soon as the voltage level sensing circuit 38 has initiated the time interval that the test voltage stays on the conductors. The relay 1 contacts also remove the fault relay coil 51 from the circuit immediately before discharge of the high voltage bus 26 of FIGURE 1.

A voltage sensing circuit which is shown schematically in FIGURE 4, is incorporated in the cable tester which will notify the timer to begin the test period when the preset voltage level is reached. The circuit consists, in part, of a string of voltage divider resistors 52 and two potentiometers 53 and 54 connected across the high voltage output. A relay 55, in series with a voltage regulator tube 56, is connected across the two potentiometers 53 and 54. When the test voltage is reached the voltage across the potentiometers 53 and 54 is sufficient to fire the tube 56. The capacitor 57 discharges through the tube 56, operating the relay 55, which in turn makes the operate circuit of the timer and the timer starts the test voltage dwell time interval of one second. Potentiometer 54 fixes the upper limit of test voltage, which will operate the circuit. Potentiometer 53 is controlled to operate the circuit at the specified test voltages from the upper limit down. This circuit has proven to be very reliable.

FIGURES 5 and 6 when assembled in the relation shown in FIGURE 7 illustrate the principal operating elements of a high voltage tester constructed in accordance with the present invention.

FIGURES 8 to 12 inclusive illustrate a portion of the relay control circuits for operating the apparatus of FIGURES 5 and 6, and FIGURES 13 to 18 illustrate the remaining relay control circuits for operating the apparatus of FIGURES 5 and 6. It should be noted that terminals A and B of FIGURE 8 and terminals A and B of FIGURE 13 are connected to terminals A and B of FIGURE 5 in order to complete the circuit diagram.

The terminal fixture shown in FIGURE 6 connects the cable wires to be tested to the set. It is equipped with fifty test terminals, a conductor ground terminal, and a sheath ground terminal. With this arrangement the connections of conductors to the test set terminals are minimized in the complete test of a cable.

Most of the cables manufactured at present are of unit construction, which provide up to 500 pairs by twisting together several units. Each unit consists of an individually bound group of up to 25 twisted pairs.

A unit type fault free cable can be completely tested with only two set-ups. First each unit is connected to the terminals, and the metallic sheath is connected to the sheath ground terminal. This tests each unit against every other unit and the sheath. Secondly, new groups of wires are formed, consisting of a single wire from each unit. These groups are connected to the test terminals. This tests each new group against every other group and the sheath.

Cables of non-unit type construction are connected as follows: Groups of conductors are formed from conductors far enough apart in the cable, that they will not break down to each other. These groups are connected to the test terminals. The metallic sheath is connected to the sheath ground terminal. Thus all adjacent wires are tested against each other and sheath.

All faulted groups must be retested to determine the faulted wire, the value of the breakdown voltage, and whether the breakdown is to the sheath. Each conductor in the faulted groups is individually connected to the test terminals and the remaining groups are connected to the conductor ground terminal. The sheath is connected to the sheath ground terminals. This tests each connected conductor against all others and the sheath.

A common method of applying and removing high voltage automatically is to control the voltage by a mechanical arrangement in the low-voltage side of the power supply. This may take the form of a motorized, variable auto-transformer. After a test is completed, the voltage is gradually reduced to zero and the charge on the cable allowed to slowly dissipate through bleeder resistors to ground. After the set is operated to the next position, the voltage is increased at a fixed rate until it reaches the specified level. With this method, the time required for switching, removal of the charge in the cable, and build up of voltage to the test value, would be much greater than the actual test time.

The method employed in the tester of the present invention results in significant reductions in the overall time required in testing a cable.

In accordance with the present invention, each of the fifty test terminals is switched by means of fifty small vacuum XI to X50 (FIGURE 6), on the high-voltage side of the power supply. These are fast acting switches capable of carrying relatively large currents at high voltage, for example 200 milliamperes at 15,000 volts. They have single pole doublethrow contacts which are actuated by a 24 volt D.C. coil. As shown in FIGURE 6, the common of each of these switches is connected to an individual test terminal on the terminal fixture. Each normally closed contact is connected to ground through an individual low value resistor R5-1 to R5-50 and each normally open contact is connected to the high-voltage side of the power supply.

The terminal to which voltage is to be applied is selected by means of stepping switch level S4-1, which has fifty positions. When the stepping switch is at its home position, which is the initial start position of the set, all the fifty vacuum relays are de-energized and all the fifty terminals are grounded through resistor R5-1 to R5-50. Thus when voltage is to be applied to a test position, the corresponding vacuum switch coil selected by stepping switch level S4-1 is energized. The test position is switched from ground and connected directly to the high-voltage side of the power supply. All the other test positions remain connected to ground.

In order to discharge the conductors as quicly as possible, a relatively large discharge current is permitted to flow. The vacuum switches XI to X50 cannot break such a large current. Thius job is done with a larger, more expensive vacuum switch Y1 (FIGURE 6) which is a fast acting switch capable of handling 100 initial amperes of discharge current from a capacitor, and can withstand 35,000 volts D.C. Its contacts are actuated by a 24 volt D.C. coil and shorts the high-voltage side of the power supply to ground, through a low value resistor R4.

When the set is at its initial start position, the specified test voltage is set-up manually by means of the variable auto-transformer 22 in the low-voltage side of the power supply. This setting is maintained during all the tests.

Before switching from one test position to the next, the voltage is removed from bus 26, by opening the input to the auto-transformer 22 on the low-voltage side of the power supply. The ground switch coil Y1, is then de-energized, its contacts short the high-voltage output of the power supply to ground through the low value resistor R4. Thus the conductors discharge rapidly through the corresponding test terminal relay X contacts, the ground relay Y1 contacts and resistor R4.

After a discharge interval, the automatic test set steps to the next position. The previous terminal is now switched from the shorted high-voltage output of the power supply 23, to its own ground through the corresponding resistor R5. The new test terminal is also switched to the shorted high-voltage output of the power supply. The switching from one position to the next is thus accomplished under zero voltage and current conditions. Once the switching is completed, the ground is removed from the high voltage output of the power supply and the voltage applied, by closing the input to the auto-transformer 23. The voltage on bus 26 rises very rapidly from zero to the preset value. In this case the rate at which the voltage increases across the test terminal depends only on the design of the power supply and the size of the cable (the RC time constant of the resistance in the power supply and capacitance of the conductors connected to the test terminal).

To eliminate any initial switching transients, the output of the auto-transformer 23 is momentarily shorted by contact MT1D, through low value resistor R1 and a 200 watt lamp I2, at the same time as the input is energized.

When the voltage is first applied to the conductors under test; the voltage across the conductors, will rise from zero to the preset value. The rate at which the voltage increases depends only on the design of the power supply and the size of the cable. To obtain a fast voltage rise, a considerable task with the high capacitance involved in a cable with many conductors and considerable length, the power supply was designed to produce 35 milliamperes at 10,000 volts.

A feature of the automatic test set of the present invention is the automatic insertion of only sufficient resistance in the high-voltage output of the power supply to limit the current drawn from the power supply to the maximum capability of the power supply, regardless of the test voltage.

The proper resistance value is switched into the high-voltage output of the power suply, by five high-voltage vacuum relays Z1 to Z5 (FIGURE 5). These relays are controlled by four cam-operated switches S14-1 to S14-4. The cams are rotated together by the voltage control shaft of the variable auto-transformer 22 in the low-voltage side of the power supply. These cams are cut in such a manner that when the high-voltage output to the power supply reaches 1500 volts, the first cam operates switch S14-1 to its position *b* and maintains this position for the rest of the upward travel of the voltage control. When 3000 volts is reached, the second cam operates switch S14-2 to its position *b* and maintains this position for the rest of the upward travel of the voltage control. When 5000 volts is reached the third cam operates switch S14-3 to its position *b* and maintains this position for the rest of the upward travel of the voltage control. When 8,000 volts is reached the fourth cam operates switch S14-4 to its position *b* and maintains this position for the rest of the upward travel of the voltage control.

The following table lists the resistors automatically inserted into the high-voltage output of the power supply, as the different specified test voltages are initially set-up manually by means of the variable auto-transformer in the low voltage side of the power supply. The maximum current that can be drawn from the power supply at the specified test voltage is also shown:

| Test voltage, volts | Relay energized | Resistors inserted in H.V. output | Maximum current, milliamps | Power supply, max. current capability |
|---|---|---|---|---|
| 0 | Z1 | (R3–1) | | |
| 1,500 | Z2 | (R3–1)+(R3–2) | 28 | 35 |
| 3,000 | Z3 | (R3–1)+(R3–2)+(R3–3) | 28 | 35 |
| 5,000 | Z4 | (R3–1)+(R3–2)+(R3–3)+(R3–4) | 28 | 35 |
| 8,000 | Z5 | (R3–1)+(R3–2)+(R3–3)+(R3–4)+(R3–5) | 28 | 35 |
| 10,000 | Z5 | (R3–1)+(R3–2)+(R3–3)+(R3–4)+(R3–5) | 35 | 35 |

This feature therefore results in the maximum possible rate of rise to the preset test voltage consistent with the rating of the power supply used. The majority of cables manufactured will rise to the maximum specified test voltage within 2 seconds. Another advantage of this feature is that the power supply does not limit the fault current more at 1500 volts than at 10,000 volts. This makes it just as easy to detect faults at low voltages as at high voltages. This simplifies the design of the fault detection circuits.

Since the resistors are inserted automatically as the specified test voltage is set-up, it is not possible to insert the wrong resistance.

Even with the high rate of voltage rise attained with the power supply and the "constant current limit circuit," a significant and varying time interval occurs before the test voltage is reached. The build-up period could range from ½ second for the smaller cables, to 3½ seconds for the largest cables.

The voltage level sensing circuit 38 accurately establishes the time that the test voltage is reached, in order to ensure that the conductors are subjected to the specified test voltage for the required period of one second. Voltage testers without this feature have to allow for the charging time of the largest cables. Thus all smaller cables are overtested. This feature, therefore, also reduces considerably the test time required for smaller cables. This can amount to 65 percent of the total time taken to test the 50 positions.

The voltage sensing circuit consists, in part, of a string of voltage divider resistors, R8 and R9–1 to R9–10, connected across the high-voltage output. The voltage level sensing selector switch S5 is set at the specified test voltage. This places a predetermined resistance across a voltage regulator tube VI in series with relay K12, and across capacitor C1. This resistance in conjunction with resistor R8 divides the voltage of the high-voltage output such that when the specified test voltage is reached, the firing voltage of the tube V1 appears across the tube and capacitor C1.

For example: If the firing voltage of the tube V1 is 100 volts and the voltage level sensing selector switch S5 is set to 8000 volts, then when the test voltage reaches 8000 volts; the voltage across resistors R9–10, R9–9, R9–8 in series, across capacitor C1, and across tube V1 reaches 100 volts. The tube fires and the capacitor C1 discharges through the tube V1 and relay K12. The relay remains energized until the voltage across the capacitor is reduced to the extinction level of the tube which is around 75 volts. The relay is energized long enough to initiate the operation of a timer which times out the one second test interval. Relay contacts K10A are opened at the beginning of the test cycle on each test position, before the test voltage is applied to the conductors.

When the test voltage has been reached and the test interval timer has been initiated, then relay contacts K10A are closed again. This shorts out relay K12 preventing its operation during the test interval. Relay K10 is operated by the control circuitry as described hereinafter.

The voltage level sensing circuit 38 is a simple and very reliable circuit. It is much more reliable than thyratron circuits. The voltage regulator tube V1 does not require heater elements and therefore no heating time is required.

Resistor R8 is also used as the main voltage divider of the voltmeter circuit. Therefore the voltmeter circuit is connected to the high-voltage output by resistor R8.

The test specification for polyethylene insulated telephone cable allows a certain number of high-voltage breakdowns between conductors (crosses and shorts) but does not tolerate any breakdown to the metallic sheath (grounds). A feature of the tester of the present invention is that it can differentiate breakdowns to the metallic sheath (grounds) from breakdowns between conductors (crosses and shorts). The "breakdown fault circuit" 39 of the invention detects both types of breakdowns. It consists essentially of a current sensitive relay K16, placed in the current return path from ground to the power supply. The circuit is arranged in such a manner, that the relay can be made to operate between 3 to 30 milliamperes, by adjusting the potentiometer R13. R12 is a low value resistor used to shunt most of the fault current around the relay. The voltage regulator tube V3, protects the circuit against any high voltage surges and together with capacitor C3, enables the circuit to respond to a single arc breakdown.

The "breakdown fault to sheath circuit 58" (FIGURE 6) detects breakdowns to the metallic sheath. It consists essentially of a neon lamp firing resistor R6, placed in the current return path from the sheath ground terminal to the power supply. The metallic sheath of the cable is always connected to the sheath ground terminal on the terminal fixture. The resulting fault current from a breakdown between the conductor tested and the sheath, will flow through resistor R6. The resulting voltage across R6 will fire the neon lamp I3. Resistor R7, limits the current which will flow through the neon lamp I3. Capacitor C5 takes care of the high transient surges resulting from arc breakdowns.

Both these fault detecting circuits 39 and 58 must be disabled while the voltage on the conductors under test is rising to the specified test value and while these conductors are being discharged. Otherwise they will both operate on the charging and discharging current.

Another feature of the present invention is the method used to disable fault circuits 39 and 58. If a fixed time interval is utilized before the fault detecting circuits are made operative during the charging interval, then this interval must be set to take care of the largest cables encountered. Therefore for small cables the fault detecting circuits could still be inoperative after the test voltage has been removed. Therefore any faults in small cables could not be detected. In this tester, the fault detecting circuits are made operative as soon as the "voltage level sensing circuit" 38 has initiated the time interval that the test voltage stays on the conductors. At this point the cable conductors are fully charged to the test voltage and the charging current will be reduced to zero. The fault detector circuits will be operative only during the test voltage time interval and therefore any faults which occur during this interval will be picked up.

When the "voltage level sensing circuit" 38 initiates timer MT2 (FIGURE 8), in the control circuit, which keeps the test voltage on the conductors for one second, relay contacts K15A (FIGURE 5) close and relay contacts K15B (FIGURE 6) open. Closed relay contacts K15A place relay K16 in the breakdown fault circuit 39 making it ready to operate on a breakdown fault. Opened relay contacts K15B open the short between the conductor ground terminal and the sheath ground terminal making the breakdown fault to sheath circuit 58 ready to operate on breakdown to sheath faults.

After the test voltage has remained on the conductors for one second it is removed and relay contacts K15A open, K15B close disabling both fault detecting circuits 39 and 58. Thus these circuits will be prevented from being operated by the discharge current.

Relay contacts K23C (FIGURE 5) and K23A (FIGURE 6) make the breakdown fault circuit 39 and the breakdown fault to sheath circuit 58 operative during the manual retest function.

If a breakdown occurs before the voltage has reached the specified test value, then the voltage level sensing circuit will not operate. The test interval timer MT2 (FIGURE 8) will therefore not be initiated and the test cycle will normally stop at this point. However this tester will take care of this condition.

The charging cycle breakdown timer MT5 (FIGURE 17) started two seconds after the voltage is first applied to the test position. In the majority of cables, this time is sufficient for the voltage to reach the full test value. However to allow for the charging time taken by the largest cables, MT5 timer is set to time out in two seconds, after which its contacts MT5A (FIGURE 17) operate. Thus if after 4 seconds, the voltage level sensing circuit has still not operated, the test position must be faulted. MT5 timer contacts MT5A will now actuate and activate both fault detecting circuits. The operation of this feature is fully described hereinafter. The fault memory circuits 40 of the invention (FIGURE 9) maintains the identity of all the test terminals where breakdowns have occurred. After completion of the test on all positions, those positions where breakdowns have occurred are displayed. Thus it is not necessary to stop the tester at each faulted position. This enables one operator to look after two or more of these sets.

Figure 9:
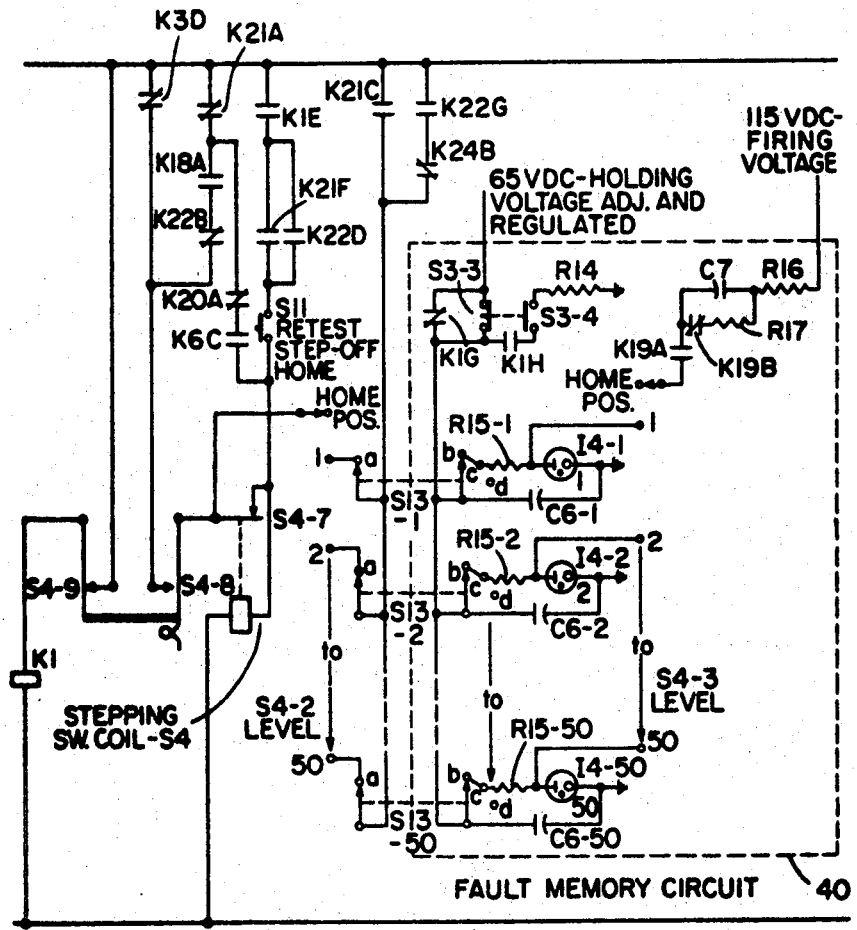

The fault memory circuit consists essentially of 50 numbered neon lamps I4-1 to I4-50. Each number corresponds to a similar numbered test position. This circuit uses the principle, that the voltage required to ignite the neon lamps is larger than the voltage required to hold it lit. Thus a holding voltage is placed on each of the 50 neon lamps through 50 individual retest position switches S13-1 to S13-50 (FIGURE 9). During regular testing all these switches are at their $a$ and $b$ positions. They are used during the retest function. The holding voltage supply is adjustable and regulated. Resistors R15-1 to R15-50 limit the current to each neon lamp. Capacitors C6-1 to C6-50 by-pass any switching transients that might occur. Stepping switch level S4-3 selects the neon lamp corresponding to the position under test and places the firing voltage circuit on it.

When the conductor connected to a test terminal breaks down, the breakdown fault circuit relay K16 energizes relay K-19. Relay K-19 is kept energized for a short time. Relay contacts K19A close and K19B open. Capacitor C7 starts to charge up by the 115 volt D.C. firing voltage, which sends a current pulse through the neon lamp corresponding to the test terminal. The neon lamp ignites and the kept lit by the holding voltage. Relay contacts K19A open and K19B close which removes the firing voltage from the stepping switch level S4-3 and discharges capacitor C7 through resistor R14, readying it for operation on the next test position. When the set steps to the next position, the neon lamp remains lit thus keeping a record of the faulted position.

If the control power is interrupted while the conductors are being automatically tested, the display of all the faulted positions would be wiped out, because the holding voltage will have been interrupted. All the positions would have to be tested again and therefore there is no point in continuing the test on the remaining positions.

Another feature of this tester is that when the control power is restored, the set will automatically step rapidly back to its initial start position. The "control power was off" lamp I11 (FIGURE 11) will light, giving an indication to the operator of what happened. The "control power ON relay" K3 (FIGURE 13) and the auto test stop relay K4 (FIGURE 13) governs this action, which is fully described hereinafter.

The stepping switch S4 consists of six ganged rotary switches of 51 positions each, called stepping switch levels S4-1 to S4-6. The first position is called "home position." When the stepping switch levels are at home position, the tester is at its initial start position. The remaining positions are designated 1 to 50. The levels are circular so that when the common contacting arms are at position 50 when the switch is actuated, they will step directly to home position. The stepping switch S-4 is stepped by a ratchet mechanism operated by a coil. When the coil is energized it pulls back a pawl, then when the coil is de-energized the pawl is released which advances the ratchet mechanism one step. Thus the common contacting arms on all the switch levels will advance one step. The stepping switch will advance, by slowly pulsing its coil, one position per pulse. It will step rapidly by self interruption, if the coil is energized through its interrupter contacts S4-7 (FIGURE 9). When the stepping switch levels are at their home positions, stepping switch OFF—normal contacts S4-8 are open and S4-9 are closed. These contacts operated on the first step off home position and they remain in this condition until the stepping switch levels are back to their home positions.

Level S4-1 (FIGURE 6) selects the test terminal relay X1 to X50 corresponding to the test terminal under test. When its common contacting arm is at say position 2, it is connected to test terminal relay X2 which when energized will remove test terminal #2 from ground and place it on the high-voltage output of the power supply, and so on through all the 50 test positions.

Level S4-2 (FIGURE 9) in conjunction with the retest position selector switches S13-1 to S13-50 permits a direct rapid return of the stepping switch to any test position for the purpose of retesting faulted positions. Say that test positions 2 and 50 are displayed as faulted at the completion of the automatic test on all test positions. All stepping switch levels would now be at their home positions. Open the "$a$" contacts of the retest position selector switches S13-2 and S13-50 (FIGURE 9) by placing them in their down positions and releasing them. Their contacts at "$d$" would be made and at C broken, thus the holding voltage to neon fault lamps I4-2 and I4-50 will be interrupted and these fault lamps will extinguish. Switches S13-2 and S13-50 would return to their centre positions by spring action and their contacts at C would remake, replacing the holding voltage to the fault lamps. The contacts at "$a$" are still broken in this position. Depress the retest step-off home pushbutton S11. This steps the stepping switch levels off their home positions and the stepping switch would step rapidly by self-interruption to position 2 and stop, because its self-interrupting circuit would be open at position 2 by the open "$a$" contacts of switch S13-2.

Stepping switch level S4-3 will now place the firing circuit on neon lamp I4-2. Thus test position 2 is now ready for retest. After this position has been retested, replace switch S3-2 to its up position, which will close its "$a$" contacts. The stepping switch will now step rapidly by self-interruption to position 50 and stop, because its self-interrupting circuit would be open at position 50 by the open "$a$" contacts of switch S13-50. Stepping switch level S4-3 will now place the firing circuit on neon lamp I4-50. Thus test position 50 is now ready for retest. After this position has been retested, replace switch S13-50 to its up position, which will close its "a" contacts. The stepping switch will now step by self-interruption to its home position and stop, because its self-interrupting circuit would be open at the home position of level S4–2.

Figure 10:
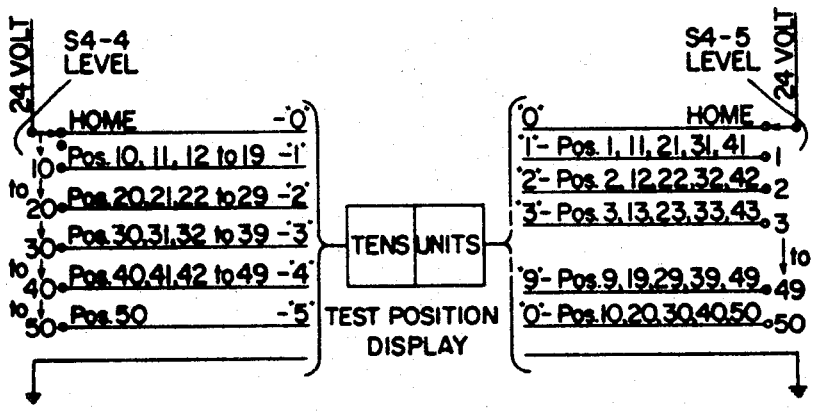

The test position display, FIGURE 10 displays each test position under test. It consists of two units mounted side by side, making one compact display unit. Each unit consists of ten condensing lenses numbered 0, 1 to 9 placed directly in front of ten small lamps. It employs a rear-projection principle. When one of the lamps at the rear of the unit is lighted, the lamp projects the corresponding number of the condensing lens through a projection lens onto the viewing screen at the front of the unit.

The power supply to each of the lamps on the right hand unit, is wired in through level S4–5 in the manner shown on the drawing. This represents the "units" portion of the test position number. The power supply to each of the lamps on the left hand unit, is wired in through level S4–4 in the manner shown. This represents the "tens" portion of the test position number. Thus when the stepping switch levels are at home position, "00" is displayed. When the stepping switch levels are at position 1, "1" is displayed. When the stepping switch levels are at position 10, "10" is displayed. When the stepping switch levels are at position 21, "21" is displayed etc. up to position 50, where "50" is displayed.

Figure 11:
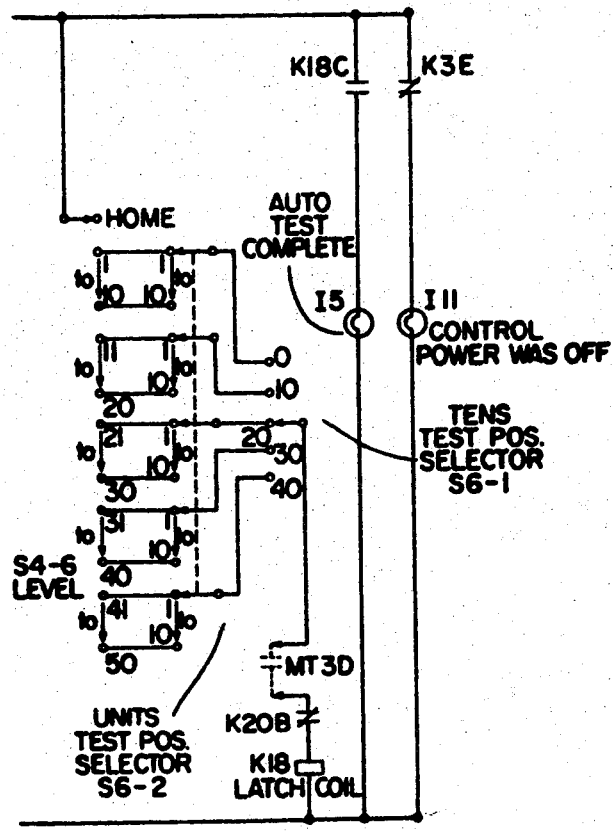

If there are less than 50 conductors to be tested, it would be a waste of time to allow the set to test all of its 50 positions. A feature is incorporated in the tester, which automatically stops the test cycle and returns the set to its initial start position after the last connected position is tested. The last test position is selected by the 5 ganged, 10 position "units test position" switch S6–2 (FIGURE 11) and the single ganged, 5 position "tens test position" switch S6–1 (FIGURE 11). Thus if there are only 25 conductors connected to the test terminals, switch S6–1 would be set to its position 20, and switch S6–2 would be set to its position 5. At the end of the test cycle on position 25, MT3 timer contacts MT3D would latch relay K18 through the 25th position of level S4–6. This would stop the tester and return it to its initial start position.

All relays in the control or programming portion of the set (FIGURES 8–18) are prefixed by the letter K. Relays K2, K7, K8, K9, K10, K11, K13, K14, K15, K17, K18, K20, K21, K22, and K24 are latching type relays. They have two coils each, the latch coil and the reset coil. All their contacts, on the drawings, are shown in the reset state. When the latch coil is pulsed, the contacts are actuated and remain in the latched state until the reset coil is pulsed.

Relays K1, K3, K4, K5, K6, K12, K16, K19, K23 are regular type relays whose contacts are actuated as long as their coils remain energized. These contacts are shown on the drawings in their de-energized state.

The sequencing of events in their proper order during the operation of the tester is controlled by timers MT1, MT2, MT3, MT4, and MT5. Timers MT1 and MT3 (FIGURE 8) are solenoid actuated, synchronous motor driven, single cycle timers. When the solenoid is energized, its plunger is lifted from the slot in cam A, which closes the switch contacts of the motor circuit. The motor starts to drive a number of cams. The cams are arranged to actuate switches at different intervals during the single revolution of the motor drive. Before the end of the complete revolution, the solenoid is de-energized which places its plunger on the circumference of cam A. The switch contacts to the motor circuit remain closed and the motor continues to drive until the slot in cam A is back to its original starting position. Then the solenoid plunger will drop into the slot, which will open the switch contacts of the motor circuit, stopping the motor. Thus the timing cycle of these timers is completed in one revolution. Each cam operated switch is set to operate at a given percentage of the revolution of the timer, which is marked beside the cam on the drawing. The timing cycle of the MT1 timer is completed in 3 seconds and the timing cycle of MT3 timer is completed in 2 seconds.

Timers MT2 (FIGURE 8), MT4 (FIGURE 14), and MT5 (FIGURE 17) are synchronous motor operated. Each is equipped with a mechanical clutch and a set of single-pole double-throw contacts. For the timer to operate, the motor must be energized. At the end of the timing interval the contacts actuate. The timer will immediately reset when the motor is de-energized.

The test cycle on each position consists basically of three stages. The charging cycle, controlled by timer MT1, the test voltage dwell time, controlled by timer MT2, and the discharge cycle, controller by timer MT3.

The sequence of events during the automatic testing of each position is as follows:

1. At the end of the discharge cycle, the timing cycle of MT1 (FIGURE 8) will be started by timer MT3 just before it comes to a stop.
2. The timing cycle of MT1 would then initiate the following sequence of events:
   2.1 Step the tester to the next position.
   2.2 Remove the test terminal from ground and place it on the high-voltage output.
   2.3 Remove the short from the high-voltage output.
   2.4 Activate the voltage level sensing circuit.
   2.5 Energize the input to the high-voltage power supply. The voltage would now be applied to the conductor and start to rise rapidly in value.
   2.6 Timer MT5 will be initiated just before timer MT1 comes to a stop.
3. When the voltage reaches the test value, the voltage level sensing circuit will initiate the following events:
   3.1 Activate the fault detecting circuits.
   3.2 Initiate timer MT2, which will keep the test voltage on the conductor for the required time of one second.
   3.3 Disable the voltage level sensing circuit.
4. When the conductor has been subjected to the test voltage for one second, MT2 timer contacts will initiate the following events:
   4.1 Reset timer MT2 to its initial state.
   4.2 De-energize the input to the high-voltage power supply.
   4.3 Start the timing cycle of timer MT3.
5. The timing cycle of MT3 would then initiate the following sequence of events:
   5.2 Disable the fault detecting circuits.
   5.2 Short the hight-voltage output to ground. The conductor will now start to discharge.
   5.3 At the end of the discharge interval, the timing cycle of MT3 will almost be concluded and just before it comes to a stop it will start the operation of MT1 timer, repeating the test cycle on the next position as described above.
6. If the voltage does not reach the test value before the timing interval of MT5 has timed out, this indicates that the conductor has faulted before the test voltage has been reached and the voltage level sensing circuit will not operate. At the end of the timing interval of MT5 its contacts will initiate the following events:
   6.1 Reset timer MT5 to its initial state.
   6.2 Disable the voltage level sensing circuit.
   6.3 Activate the fault detecting circuits.
7. The fault detecting circuits will then initiate the following events:
   7.1 Light the lamp corresponding to the faulted test terminal, in the fault memory circuit.
   7.2 If the breakdown is to the metallic sheath, the sheath-fault lamp will light and remain lighted only until the voltage is removed from the faulted conductor.
   7.3 De-energize the input to the high-voltage power supply.
   7.4 By-pass MT2 timer and start the timing cycle of timer MT3.

8. The timing cycle of MT3 would then initiate the sequence of events as described under paragraph 5.
9. If the conductor breaks down after timer MT2 is initiated (see paragraph 3.2) the fault detecting circuit will initiate the following events:
   9.1 Light the lamp corresponding to the faulted test terminal, in the fault memory circuit.
   9.2 If the breakdown is to the metallic sheath, the sheath-fault lamp will light and remain lighted only until the voltage is removed from the faulted conductor.
   9.3 De-energize the input to the high-voltage power supply.
   9.4 De-energize MT2 timer and therefore it will reset immediately to its initial state before its timing interval has timed out.
   9.5 Start the timing cycle of timer MT3.
10. The timing cycle of MT3 would then initiate the sequence of events as described under paragraph 5.
11. When the last position has been tested, just before the timing cycle of MT3 comes to a stop, the tester reset circuit will actuate which will initiate the following events:
   11.1 Prevent MT1 timer from being started.
   11.2 Step the tester rapidly back to its initial start position.
   11.3 Light the auto-test complete lamp.

Means are provided for by-passing or stepping over the one second voltage test interval, when a fault occurs.

When the operation of the tester is stopped at any position, the timer controlling the test cycle stage at which the set is stopped, will be returned to its initial position, and the test cycle will be prevented from proceeding to the succeeding stage. When the test cycle is again initiated, the tester will repeat the test on the same position before continuing to test the remaining positions.

Means are also provided for retesting the faulted conductor automatically or manually.

During the manual testing of faulted conductors, the tester is prevented from being stepped to another position until the tested conductor has been discharged.

A complete and detailed operating description of the automatic high voltage dielectric test set in accordance with the present invention will now be set out detailing all procedures involved in the operation and use of the apparatus as illustrated in FIGURES 5 through 18 inclusive.

(1) *Initial set-up*

1.1 The high-voltage output of the power supply is shorted to ground
   through ground delay Y1 contacts and resistor R4
   ground relay Y1 is in its de-energized state.
1.2 Stepping switch S4 is at its home position
1.3 Voltage control at zero position
   voltage control cam-operated switches S14–1 to S14–4 will be in the position as shown.
1.4 Close main power breaker S1
   1.4.1 Current limiting resistor R3–1 is placed in the high-voltage output of the power supply.
      through current limiting relay Z1 contacts
      current limiting relay Z1 will energize through the voltage control cam-operated switch S14–1.
   1.4.2 Position display—will indicate "00"
      through stepping switch levels S4–4 and S4–5
   1.4.3 The holding voltage is connected to the fault position memory display lamps I4–1 to I4–50
      through auto test start switch contacts S3–3
   1.4.4 Home position relay K1 is energized
      through stepping switch off-normal contacts S4–9, which are closed at its home position.
   1.4.5 The auto test ground control relay K9 and the fault circuit disabling relay K15 will reset, if they are not in this state already.
      by closed relay contact K4F
   1.4.6 The position retest relay K20 will be prevented from being latched through the closed relay contacts K4G
      by opened relay contacts K1D
      thus contact K20A in the stepping switch step circuit will remain closed, allowing relay contact K6C to step the set to the first test position when the automatic test is initiated.
1.5 Depress and release "ready" pushbutton S2
   1.5.1 Reset relay K2 will be latched and reset.
      Its latch coil will be energized by "ready" switch contacts S2–1, through closed relay contacts K4D
      Its reset coil will be energized through "ready" switch contacts S2–2
      Thus relays K7, K8, K10, K11, K13, K14, K17, K20, K24, will be reset, if they are not in this state already, to prepare them for the automatic test cycle.
      These relays can only be reset when the control power has been interrupted or when the automatic test cycle has been stopped, because of contact K4D. Thus while the automatic test is in progress the proper operating sequence cannot be changed by depressing the "ready" pushbutton S2.
   1.5.2 Control power ON relay K3 is energized.
      by "ready" switch contact S2–3, through closed relay contacts K1F
      and locked-in through its contacts K3A
      Thus this relay cannot be energized unless the stepping switch is at its home position
   1.5.3 Auto test stop relay K4 is energized
      by relay contacts K2A and K3B
      and locked-in by its contacts K4A.

(2) *Manual presetting of the test voltage*

2.1 Stepping switch S4 must be at its home position
2.2 "Ready" pushbutton S2 must have been actuated
2.3 Voltage control must be at its zero position
2.4 Set the voltage level sensing selector switch to the required test voltage.
2.5 Depress the high voltage on auto test pushbutton S15 and keep depressed while the test voltage is being manually set-up.
   2.5.1 the high voltage ON contactor K5 is energized through closed relay contacts K1A and K4E.
      Thus if the stepping switch S4 is not at its home position and the "ready" pushbutton S2 has not been actuated, then the high voltage ON contactor K5 will not energize.
      Open relay contact K1B will prevent the contactor contact K5A from "locking-in" the contactor K5.
      Ground relay Y1 will energize through closed contactor contact K5D
      Thus the short will be removed from the high-voltage output of the power supply.
      The input to the high-voltage power supply will energize and the high voltage ON lamp will light by closed contactor contacts K5B and K5C.
2.6 Manually increase the voltage control, until the required test voltage is indicated on the voltmeter M1. Leave the voltage control in this position.
   2.6.1 Closed contacts K10A prevents the voltage level sensing circuit relay K12 from operating
   2.6.2 The voltage control cam-operated switches S14 will operate in sequence, thereby placing the proper current limiting resistance R3 in the high-voltage output of the power supply.
      through the remaining closed current limiting relay Z contacts.

This maintains the current, drawn from the power supply, fairly constant regardless of the voltage setting.

2.7 Release the high voltage on auto test pushbutton S15
   2.7.1 The high voltage on contactor K5 will de-energize. Thus removing the output voltage and discharging the power supply output capacitor C4 through the resistor R4.

*(3) Automatic testing*

The test cycle on each position consists basically of three stages: the "charging cycle" controlled by timer MT1, the "test voltage dwell time" controlled by timer MT2, and the "discharge cycle" controlled by the timer MT3.

3.1 The test voltage has been preset and the set is now ready to test the cable conductors connected to the 50 test terminals.
3.2 All the remaining conductors in the cable, are connected to the conductor ground terminal.
3.3 The metallic sheath of the cable, is connected to the sheath ground terminal.
3.4 Set the "tens" test position selector switch S6–1 to position 40. Set the "units" test position selector switch S6–2 to position 10.
   3.4.1 This sets up test terminal 50, as the last terminal to be tested before the set resets automatically to its initial start position.
   3.4.2 If there are less than 50 cable conductors, say 25, which fill the test terminals up to terminal 25, then the "tens" and "units" position selector switches would be set at 20 and 5 respectively. Thus test terminal 25 would be the last terminal tested before the set resets automatically to its initial start position.
3.5 Depress and release the "start auto test" pushbutton S3.
   3.5.1 Stepping switch homing relay K18 is reset.
      by "start auto test" switch contacts S3–1 and closed relay contact K1C. Thus this relay cannot be reset unless stepping switch S4 is at its home position.
   3.5.2 The holding voltage of the fault position memory display lamps I4–1 to I4–50 is momentarily removed and capacitors C6–1 to C6–50 discharged through resistor R14, by the start auto test switch contacts S3–3 and S3–4.
      Thus any fault position memory display lamps which have been lit during the previous automatic test will now extinguish.
      Relay contacts K1G and K1H prevent them from being extinguished at any other position of the stepping switch except home position.
   3.5.3 Stepping switch pulse relay K6 is energized
      by the start auto test switch contact S3–2 and closed relay contacts K18B.
      and locked-in through its contacts K6B.
      Relay contacts K18B prevent the start auto test pushbutton from energizing this relay while the stepping switch S4 is stepping home, at the completion of the test cycle on the last position.
      Which energizes the stepping switch S4 coil, through its closed contact K6C, thereby pulling forward the pawl of its ratchet mechanism.
      which latches the MT1 timer start relay K7 through contacts K6A.
3.6 MT1 timer solenoid is energized
   by relay contacts K7A, through closed contacts K4B the solenoid lifts its plunger from the slot in cam A, which closes switch MT1A thereby energizing MT1 timer motor, and lighting MT1 timer on lamp I6.
3.7 The timing cycle of timer MT1 is thus initiated:
   3.7.1 This timer controls the charging cycle. It will make one complete revolution in 3 seconds, at which time the slot in cam A will be back to its original position, completing its timing cycle. It drives a number of cams which are arranged to actuate switches at different intervals during its timing cycle.
   3.7.2 After 5% of the timing cycle (.15 second) cam B, closes and opens switch contacts MT1B, which latches relays K8, K9, and K10.
      3.7.2.1 Stepping switch pulse relay K6 is de-energized
         by open relay contacts K8A
      3.7.2.1 The stepping switch S4 coil is de-energized
         by open relay contact K6C
         thus releasing the pawl from the stepping switch S4 ratchet mechanism which steps the stepping switch to its position 1.
         At the end of the test cycle on each position, the set will step to the next position in this manner. Thus it will step from position 1 to 2, to 3 etc., up to the last test position.
      3.7.2.3 The circuit to MT1 timer start relay K7 latch coil is opened
         by opened relay contact K6A
      3.7.2.4 Test terminal relay X1 is energized
         by closed relay contact K8B and the #1 position of stepping switch level S4–1.
         which removes test terminal 1 from ground and connects it to the high-voltage output
         Thus at completion of the test cycle on each terminal, relay K8B in conjunction with stepping switch level S4–1 will remove the next terminal from ground and connect it to the high-voltage output in this manner.
         Thus relay contacts X1 are closed, then X2, X3 etc.
      3.7.2.5 Ground relay Y1 is energized
         by closed relay contacts K9A
         which removes the short from the high-voltage output
      3.7.2.6. The short across the voltage level sensing circuit relay K12 is opened
         by opened relay contact K10A
         which readies it for operation
      3.7.2.7 Home position relay K1 is deenergized
         by opened stepping switch off-normal contacts S4–9. These contacts remain open until the stepping switch S4 again reaches its home position
      3.7.2.8 The test position display indicates "1."
         through the "1" position of stepping switch level S4–5
         Thus as each position is tested, the test position display will indicate "1," "2," etc. up to "50," by stepping switch levels S4–5 and S4–4
      3.7.2.9 The 115 volt D.C. firing voltage circuit is placed on the fault position display lamp 1 (I14–1)
         through the "1" position of stepping switch level S4–3
         Thus as each test position is tested, the 115 v. firing voltage circuit is placed on the corresponding fault position display lamp through the stepping switch level S4–3.
      3.7.2.10 The stepping switch S4 self-interrupting retest position circuit is placed on the corresponding retest position selector switch S13.
         by the stepping switch level S4–2
         this enables the stepping switch S4 to position itself to the proper test terminal for retest.

3.7.2.11 Part of the stepping switch S4 self-interrupting homing circuit is closed.
   by closed stepping switch off-normal contacts S4–8. These contacts remain closed until the stepping switch S4 again reaches its home position.
   ready it for operation.

3.7.3 After 15% of the timing cycle (.45 second) cam C, closes and opens switch contacts MT1C, which pulses relay K20 reset coil.

3.7.4 After 25% of the timing cycle (.75 second) cam D, closes switch contacts MT1D and keeps them closed for an additional 5%, that is for 0.15 second.
   3.7.4.1 Shorting out the input to the high-voltage power supply through resistor R1 and the 200 watt lamp I2 for .15 second.
      this prevents high voltage switching transients from being superimposed on the cable conductors under test, when the input to the high-voltage power supply is energized by the high voltage On contactor contacts K5B and K5C.

3.7.5 After 25% of the timing cycle (.75 second) cam E, closes and opens switch contacts MT1E, which energizes the high voltage on contactor K5.
   which is locked-in by its closed contacts K5A, through closed contacts K17B, K23E and K1B
   which energizes the input to the high-voltage power supply and lights the high voltage on lamps I1, by contacts K5B and K5C 3.7.5.1 The test voltage starts to build up, to its preset value, on the cable conductors connected to the test position.
      the time interval depends on the RC time constant of the high-voltage power supply and the cable conductors under test.
      if the conductor under test breaks down before the preset test voltage has been reached (see section 3.13)

3.7.6 After 85% of the timing cycle (2.55 seconds) cam F, closes and opens switch contacts MT1F, which reset MT1 timer start relay K7.
   3.7.6.1 Which de-energizes MT1 timer solenoid, allowing the solenoid plunger to ride on the circumference of cam A.
      by opened contact K7A
      this still keeps switch MT1A closed and the timer motor energized. However, it will allow MT1 timer to stop when its timing cycle is completed.

3.7.7 After 90% of the timing cycle (2.7 seconds) cam G closes and opens switch contacts MT1G, which latches the charging cycle breakdown timer start relay K11
   through closed relay contact K14A and K4H
   3.7.7.1 Which energizes the charging cycle breakdown timer MT5.
      by closed contacts K11A.
      This timer is adjustable and set to close its contacts MT5A in 2 seconds.
      Thus the maximum time interval allowed, for the maximum test voltage to build up to its preset value, before timer MT5A contacts are actuated is 4 seconds (2 seconds during the timing interval of MT1 timer plus the 2 seconds taken by timer MT5 to time out). This is ample to take care of the largest cable capacitance of approximately 2 mf. which would be encountered.

3.7.8 After 100% of the timing cycle (3 seconds) cam A has rotated through one complete revolution and its slot is back to its original start position.
   3.7.8.1 The solenoid plunger drops into this slot. which opens MT1A switch contacts, thereby de-energizing MT1 timer motor, thus stopping the timer rotation. The MT1 timer on lamp I6 will extinguish.

3.8 Test voltage reaches preset value: When the test voltage reaches its preset value, after the high-voltage power supply has been energized at 25% of the timing cycle of timer MT1.
   in most cases this occurs in less than 2 seconds.

3.8.1 Relay K12 in the voltage level sensing circuit energizes.

3.8.2 MT2 timer starts relay K13 and charging cycle breakdown timer stop relay K14 are latched.
   by closed relay contacts K12A 3.8.3 The test voltage interval timer MT2 is energized and MT2 timer on lamp I8 lights.
   by closed relay contacts K13A, through the closed relay contacts K4B.
   This timer is adjustable and set to close its contacts MT2A, in 1 second after it has been energized.
   This timer allows the test voltage to dwell on the cable conductors under test for one second after the test voltage reaches its preset value.

3.8.4 If the voltage reaches its preset value before 90% of the timing cycle of MT1 timer has elapsed; cam G switch contacts MT1G are prevented from energizing MT5 timer.
   If the test voltage reaches its preset value after MT5 timer has been initiated, MT5 timer will de-energize and therefore, it will reset to its original condition
      by opened relay contact K14A.
      This prevents the MT5 timer from being operated unnecessarily and also avoids the possibility of relay K15 being latched again after it has been reset during the discharge cycle.

3.8.5 The fault circuit disabling relay K15 is latched and relays K10, K11 reset
   by closed relay contacts K13B, through closed relay contacts K4H.

3.8.6 Voltage level sensing circuit will be disabled by closed contact K10A which shorts out relay K12.
   This prevents the possibility of relay K12 operating more than once before the test voltage is removed, and also prevents it from operating during the manual presetting of the test voltage. See section 2.

3.8.7 MT5 timer circuit is kept open
   by opened relay contact K11A 3.8.8. Breakdown fault circuit relay K16 is placed in the breakdown fault circuit
   by closed contact K15A
   Breakdown fault circuit relay K16 is now ready to operate on the occurrence of a breakdown fault. It is thus allowed to operate when the test voltage on the cable conductors reaches its initial preset value because then the resulting charging current has been reduced to zero
   this prevents the breakdown fault circuit relay K16 from being operated by the charging current.

3.8.9 The sheath ground terminal is removed from ground
   by opened relay contact K15B.
   The breakdown fault to sheath circuit is now ready to indicate a breakdown fault to sheath. It is thus prevented from being operated by the current, charging the capacitance between the cable conductors connected to ground and the cable sheath, while the test voltage is building up.

3.8.10 If the conductor under test breaks down during this test interval, see section 3.14

3.9 Test time interval completed: When the conductors under test have been subjected to the preset test voltage value for one second, MT2 timer contacts, MT2A close which resets the MT2 timer start relay K13 and latches the MT3 timer start relay K17

3.9.1 MT2 timer is de-energized and thus resets to its initial state. MT2 timer On lamp I8 extinguishes.
      by opened relay contacts K13A.

3.9.2 The circuit to relay K15 latch coil and relays K10 and K11 reset coils is opened
      by opened relay contact K13B.

3.9.3 The high voltage on contactor K5 is de-energized
      by opened relay contact K17B
      which de-energizes the input to the high-voltage power supply and extinguishes the high voltage on lamp I1

3.9.4 MT3 timer solenoid is energized.
      by closed relay contacts K17A, through closed contacts K4B.
      The solenoid lifts its plunger from the slot in cam A, which closes switch MT3A, thereby energizing MT3 timer motor. MT3 timer on lamp I7 lights.

3.10 The timing cycle of timer MT3 is thus initiated.

3.10.1 This timer controls the discharge cycle. It will make one complete revolution in 2 seconds, at which time the slot in cam A will be back to its original position, completing its timing cycle in 2 seconds. It drives a number of cams which are arranged to actuate switches at different intervals during its timing cycle.

3.10.2 After 5% of the timing cycle (.1 second) cam B, closes and opens switch contacts MT3B, which resets relays K9 and K15.

3.10.2.1 Ground Relay Y1 is de-energized
         by opened relay contacts K9A
         which shorts the high-voltage output of the power supply to ground through Y1 contacts and resistor R4.
         thus cable conductors connected to the test position start to discharge through the corresponding test terminal relay X contacts, ground relay Y1 contacts and resistor R4.

3.10.2.2 Breakdown fault circuit relay K16 is removed from the breakdown fault circuit.
         by opened relay contacts K15A.
         This prevents the breakdown fault circuit relay K16 from being operated by the discharge current.

3.10.2.3 The sheath ground terminal is connected to ground
         by closed relay contact K15B.
         This shorts out the breakdown fault to sheath circuit, which prevents it from being operated by the current discharging the capacitance between the cable conductors connected to ground and the cable sheath.

3.10.3 After 5% of the timing cycle (.1 second) cam C, opens and closes switch contacts MT3C
      3.10.3.1 Which will de-energize fault memory pulse relay K19 if it has been energized due to the occurrence of a breakdown fault.

3.10.4 After 85% of the timing cycle (1.7 seconds) cam D, closes and opens switch contacts MT3D
      3.10.4.1 Which will latch the stepping switch homing relay K18.
      If the stepping switch level S4–6 is at the position which has been selected, by the "units" and "tens" position selector switches S6–2, S6–1, as the last "test terminal" to be tested—see section 3.12

3.10.5 After 85% of the timing cycle (1.7 seconds) cam E, closes and opens switch contacts MT3E, which will reset relays K8, K14, K17.
      3.10.5.1 Which de-energizes MT3 timer solenoid allowing the solenoid plunger to ride on the circumference of cam A
         by opened relay contact K17A.
         This still keeps switch MT3A closed and the timer motor energized. However, it will allow MT3 timer to stop when its timing cycle is completed.
      3.10.5.2 Locking circuit of high voltage on contactor K5 is closed.
         by closed contact K17B.
         This enables high voltage on contactor K5 to lock-in which it is again energized on the next test position.

3.10.6 After 90% of the timing cycle (1.8 seconds) cam F, closes and opens switch contacts MT3F, which will energize stepping switch pulse relay K6 through closed relay contact K8A
      which will again initiate the auto test cycle, starting from paragraph 3.5.3
      after 5% of the timing cycle of MT1 timer, the stepping switch S4 will be stepped to the next position and the conductors connected to the previous position will be recommended to ground. The conductors connected to the new position will now be tested in the manner indicated.

3.10.7 After 100% of the timing cycle (2 seconds) cam A has rotated through one complete revolution and its slot is back to its original start position.
      3.10.7.1 The solenoid plunger drops into this slot
         which opens MT3A switch contacts, thereby de-energizing MT3 timer motor, thus stopping the timer rotation. MT3 timer on lamp I7 extinguishes.

3.11 In this manner the conductors connected to each test terminal are tested in turn.
   3.11.1 Approximately two second are allowed to discharge the conductors after the preset test voltage interval. Thus the test terminal relays X1 to X50 are switched under zero voltage and current conditions.

3.12 Last terminal tested: After the last test position, as set-up by the "units" and "tens" position selector switches S6–2 and S6–1, has been tested
   (see section 3.10.4)
   3.12.1 MT3D switch contactors will latch the stepping switch homing relay K18
   3.12.2 The stepping switch self-interrupting homing circuit will close
      by closed relay contacts K18A.
      The stepping switch S4 will now step rapidly rapidly by self-interruption to its some position.
   3.12.3 The auto test lamp I5 will light by closed relay contacts K18C indicating that all the test positions have been tested.
   3.12.4 If the "start auto test" pushbutton is depressed while the stepping switch S4 is stepping back to its home position
      open relay contact K1C will prevent relay K18 from being reset, thus the stepping switch S4 will not be stopped from stepping to its home position.
      Open relay contact K18B will prevent the initiation of the automatic test cycle.

3.12.5 When the stepping switch S4 reaches its home position
  it will stop by its Off-Normal contacts S4–8, which will open the self-interrupting homing circuit.
  Relay K1 will energize through the stepping switch off-normal contacts S4–9, which will close.
3.13 Fault before test voltage is reached: If the conductor under test breaks down before the preset test voltage has been reached
  (see section 3.7.5)
  3.13.1 the preset test voltage level will not be reached. The voltage level sensing circuit will therefore, not operate and relay K12 will not energize. thus MT2 timer start relay K13 and relay K14 will not latch.
  3.13.2 The timing cycle of the MT1 timer will however, continue and after 90% of its timing cycle (2.7 seconds) MT5 timer will energize and start its timing interval
    see sections 3.7.6, 3.7.7 and 3.7.8
  3.13.3 After MT5 timer has timed out, its contacts MT5 will reset relays K10, K11 and latch, relay K15
  3.13.4 The voltage level sensing circuit will be disabled
    by closed relay contacts K10A which shorts out relay K12
  3.13.5 The MT5 timer will be de-energized and therefore, will reset to its initial position.
    by opened relay contacts K11A.
  3.13.6 The breakdown fault circuit is now made operative
    by closed relay contacts K15A which closes the circuit of relay K16,
  3.13.7 The sheath ground circuit is now made operative
    by opened contacts K15B which removes the ground from the sheath ground terminal.
  3.13.8 Breakdown fault circuit relay K16 will operate by the fault current.
  3.13.9 The fault memory pulse relay K19 will energize
    by closed relay contacts K16A
    and lock-in through its closed contacts K19D
  3.13.10 A 115 volt D.C. pulse will be applied to the fault position display neon lamp associated with the terminal under test, by the position of stepping switch level S4–3
    by closed relay contacts K19A and opened relay contacts K19B.
    The fault position neon display lamp will light and remain lit by the 65 v. D.C. holding voltage.
    thus an indication of the faulted test terminal will be maintained.
  3.13.11 If the conductor under test breaks down to the metallic cable sheath, the sheath fault lamp will light and extinguish when the high-voltage is removed.
    it is not too important if it is not spotted at this this time, since it will again show upon retest.
  3.13.12 MT3 timer start relay K17 will latch
    by closed relay contacts K19C
  3.13.13 The high voltage on contactor K5 is de-energized
    by opened relay contacts K17B
    which de-energizes the input to the high-voltage power supply and extinguishes the high voltage on lamp I1
  3.13.14 MT2 timer start relay K13 being in its reset state, the operation of MT2 timer will be by-passed.
  3.13.15 The timing cycle of timer MT3 will be initiated as indicated in paragraph 3.9.4. The sequence of operations controlled by this timer will now occur as shown in section 3.10
  3.13.16 Thus after 5% of the timing cycle (.1 second) of timer MT3
    the cable conductors connected to the terminal just tested are connected to ground.
    Breakdown fault circuit is disabled
    sheath ground circuit is disabled
    fault memory pulse relay K19 is de-energized which will remove the 115 v. D.C. firing voltage from the capacitor C7 and discharge it. Thus readying it for use on the next test position.
  3.13.17 Thus when the conductor under test breaks down before the present test voltage has been reached
    Timer MT1 completes its timing cycle if not already completed
    Timer MT2 is by-passed
    Timer MT3 is initiated which controls the discharge cycle and initiates the testing cycle on the next test position.
    The faulted position remains displayed in the fault memory circuit.
3.14 Fault after test voltage is reached: If the conductor under test breaks down after the preset test voltage has been reached
  (see section 3.8)
  the fault circuit is operative
  the sheath ground circuit is operative
  3.14.1 The events shown in paragraphs 3.13.8, 3.13.9, 3.13.10 and 3.13.11 respectively will occur
  3.14.2 MT3 timer start relay K17 will latch and MT2 timer start relay K13 will reset
    by closed contact K19C
  3.14.3 The high voltage on contactor K5 is de-energized
    by opened contact K17B
    which de-energizes the input to the high-voltage power supply and extinguishes the high voltage on lamp I1.
  3.14.4 MT2 timer will de-energize and thus immediately reset to its initial position. The MT2 timer on lamp I7 will extinguish
    by opened contact K13A
  3.14.5 The events shown in paragraphs 3.13.15 and 3.13.16 respectively will occur.
  3.14.6 Thus when the conductor under test breaks down after the preset test voltage has been reached
    Timer MT1 completes its timing cycle if not already completed
    Timer MT2 is immediately reset.
    Timer MT3 is initiated which controls the discharge cycle and initiates the testing cycle on the next position.
    The faulted position remains displayed in the fault memory circuit.

(4)     *Retesting of faulted conductors*

Retesting of the faulted conductors is necessary in order to determine that the fault is not due to arcing at the stub end of the cable or between wires at the terminal end of the terminal fixture. A certain number of conductors with high voltage failures are tolerated in each cable. Thus it is necessary to determine the breakdown voltage of each faulted conductor. It is also necessary to determine whether the breakdown is to the metallic sheath, since no such failures can be tolerated in the cable.

4.1 Automatic retest:
  4.1.1 When all the conductors connected to the test terminals have been tested.

Those that are faulted will be displayed by the fault position memory display lamps.

Stepping switch S4 will be at its home position, thus home position relay K1 will be energized, and test position display will indicate "00."

The required test voltage will still be set-up at its initial preset value, because the voltage control has not been removed from its initial position.

The control power ON relay K3 and the auto-test stop relay K4 will still be energized.

Stepping switch homing relay K18 will be in its latched state.

4.1.2 Depress and release auto retest push-button S8.
    4.1.2.1 Auto retest relay K21 will latch
        through closed contacts K1C.
        thus this relay can only latch, when the stepping switch S4 is at its home position.
        This relay sets up the control circuit for automatic retest.
    4.1.2.2 Auto retest lamp I9 will light
        by closed contact K21B
    4.1.2.3 Stepping switch step circuit is made ready
        by closed relay contacts K21F
        this allows the stepping switch S4 to step off its home position when the retest step-off home push-button S11 is actuated.
    4.1.2.4 Stepping switch self-interrupting homing circuit is kept open.
        by opened contact K21A
        this prevents the stepping switch S4 from stepping back to its home position when stepped off home, through its closed OFF-Normal contacts S4–8 and closed relay contacts K18A.
    4.1.2.5 Stepping switch self-interrupting retest position circuit is made ready
        by closed contact K21C
        this enables the stepping switch S4 to rapidly step to the position to be "retested."

4.1.3 Depress, completely down and release, all the retest position selector switches S13, corresponding to the lamps which are lit on the fault position memory display.

As these switches are placed in the down position, to contact *d*, the holding voltage will be removed from the corresponding fault position memory display lamps and they will extinguish.

When these switches are released they will return to their centre position, contact C, by spring action. The holding voltage will be replaced on the lamps through switch contacts C. However the corresponding switch contacts *a* will be open, thereby opening the stepping switch self-interrupting retest position circuit at points corresponding to the faulted positions.

Thus the retest position selector switches corresponding to faulted test positions, will be in their centre position, and all the remaining retest position selector switches corresponding to the remaining test positions, will be in their up position (contacts *a* and *b* made).

4.1.4 Depress and release the retest step-off home pushbutton S11.
    4.1.4.1 The stepping switch S4 will rapidly step, by self-interruption through its switch level S4–2, to the first faulted position and stop at this position.
        because the corresponding retest position selector switch S13, contact *a* will be open at this position. Thus the stepping switch S4 self-interrupting retest position circuit will first be opened at this position.

The test position display will indicate the position that is being retested, through the stepping switch levels S4–4 and S4–5.
    4.1.4.2 The home position relay K1 will be de-energized
        by the opened stepping switch off-normal switch contacts S4–9.

4.1.5 Initiate the automatic test cycle by depressing and releasing the start auto test pushbutton S3.
    4.1.5.1 The stepping switch homing relay K18 will not reset
        by start auto test switch contacts S3–1 because relay contact K1C will be open.
    4.1.5.2 The holding voltage of the fault position memory display lamps I4–1 to I4–50 will not be interrupted.
        by start auto test switch contacts S3–3 and S3–4
        because relay contacts K1G will be closed and K1H will be open.
        Thus the fault position memory display lamps cannot be extinguished when already lit, by initiating the automatic test cycle during retest.
    4.1.5.3 Stepping switch pulse relay K6 is energized
        by the start auto test switch contacts S3–2, through closed relay contacts K21E which shorts out the open relay contacts K18B
        and locked-in through its contacts K6B.
        the stepping which S4 coil will be prevented from energizing by the open relay contact K21A. Thus subsequently when relay K6 is de-energized, the stepping switch S4 will not step to its next position,
        which latches the MT1 timer start relay K7 through contacts K6A.
    4.1.5.4 Thus the automatic testing cycle is initiated and the sequence of events occurs as outlined in sections 3.6, 3.7, 3.8, 3.9 and 3.10.
        However, the stepping switch S4 will not step at its next position as outlined in paragraph 3.7.2.2, since open relay contact K21A, prevents the stepping switch S4 coil from being energized.
        However when MT3 timer switch contacts MT3F are actuated, at the end of the timing cycle, as outlined in paragraph 3.10.6; opened relay contacts K21D prevents it from again initiating the automatic test cycle, and the automatic test cycle is stopped.
        The set still remains at the same position.
        If the corresponding fault position memory display lamp is not lighted again, then the fault must have been due to a flashover at the stub end of the cable or between wires at the terminal fixture, which has cleared itself.
    4.1.5.4 When the conductor again breaks down, the sequence of events occurs as outlined in sections 3.13 and 3.14.
        However opened relay contacts K21D prevents the automatic test cycle from repeating on the next position and it is stopped at the same position.
        the reading on the voltmeter M1 will drop.
        The corresponding fault position memory display lamp is again lighted.

If the conductor breaks down to the metallic sheath, the sheath fault lamp I3 will have been lit. This should be noted and recorded.

The voltage at which breakdown occurs is noted and recorded.

4.1.5.5 Automatic retest, as outlined above in section 4.1.5, can be repeated on the same position as often as required, by simply actuating the start auto test pushbutton S3 each time.

4.1.5.6 Replace the retest position selector switch S13, corresponding with the faulted position just retested, to its "up" position.

Its switch contact *a* will close, thus closing the stepping switch self-interrupting retest position circuit to the next faulted position, and the stepping switch S4 will rapidly step to this position by self-interruption and stop at this position.

This position can now be automatically retested as outlined above in section 4.1.5.

In this manner the set is brought up to each faulted position in turn for retest.

At the last faulted position, switch contact *a* will complete the stepping switch self-interrupting retest position circuit to home position on the stepping switch level S4-2. The stepping switch S4 will thus rapidly step to its home position and stop. Thus now all the retest position selector switches S13 will be in their "up" position and all the positions which have again faulted will be displayed.

4.1.5.7 After automatic retest has been completed on all the faulted positions, the remaining cable conductors which have not as yet been tested, can now be tested by connecting them to the test terminals, after removing and grounding the previously tested conductors.

The test voltage is still set at its required value, because the voltage control has not been removed from its initial position.

Reset for automatic test by depressing the reset pushbutton S12. Since stepping switch S4 is at its home position the auto retest relay K21 will reset through closed contacts K1C. The auto retest lamp I9 will extinguish. Thus the auto retest relay K21 cannot be reset unless the stepping switch S4 is back at its home position.

Proceed with the automatic test as outlined in section 3.

4.2 Manual retest: When the breakdown voltage of the faulted conductors, as determined by the automatic retest procedure section 4.1, is close to the value of the allowable high voltage failures, then a more accurate determination of the breakdown voltage must be made. Connect all such faulted conductors in the cable, to the test terminals in sequence starting from "1" and connect all the remaining conductors to the conductor ground terminal. The metallic sheath is left connected to the sheath ground terminal. Stepping switch S4 will be at its home position, thus home position relay K1 will be energized, and the test position display will indicate "00." The control power ON relay K3 and the auto-test stop relay K4 will still be energized. The stepping switch homing relay K18 will be in its latched state.

4.2.1 Reset the voltage control to its zero position.

4.2.2 Depress and release Manual retest pushbutton S9.

4.2.2.1 Manual retest relay K22 will latch through closed contacts K1C.

Thus this relay can only latch, when the stepping switch S4 is at its home position. This relay sets up the control circuit for manual retest.

4.2.2.2 Manual retest lamp I10 will light by closed contact K22H.

4.2.2.3 Stepping switch step circuit is made ready by closed relay contacts K22D.

This allows the stepping switch S4 to step off its home position when the retest step-off home pushbutton S11 is actuated.

4.2.2.4 Stepping switch self-interrupting homing circuit is kept open by opened relay contacts K22B.

This prevents the stepping switch S4 from stepping back to its home position when stepped off home, through its closed Off-Normal contacts S4-8 and closed relay contacts K18A.

4.2.2.5 Stepping switch self-interrupting retest position circuit is made ready by closed relay contacts K22G.

This enables the stepping switch S4 to rapidly step to the position to be retested.

4.2.2.6 The automatic test cycle is prevented from being initiated while the manual retest is in progress.

by opened relay contacts K22A.

4.2.3 The set is brought to each faulted position in turn for manual retest, by following the procedure as outlined in sections 4.1.3, 4.1.4, 4.1.5.6 except the second paragraph in section 4.1.5.6.

4.2.4 Each faulted position in turn is retested in the following manner;

4.2.4.5 Depress the high voltage ON manual retest pushbutton S10 and keep it depressed.

high voltage ON manual retest relay K23 is energized by the high voltage ON manual retest switch contacts S10-1 and closed relay contacts K1B and K22C. Thus this relay can only be actuated when the set is set-up for the manual retest function and is off its home position.

The circuit to the manual retest discharge timer MT4 and the Horn is kept open by the high voltage ON manual retest switch contacts S10-2.

4.2.4.6 The high voltage ON contactor K5 is energized by closed relay contacts K23D.

It is prevented from locking-in, through its contacts K5A, by opened relay contacts K23E.

Ground Relay Y1 is energized by closed contacts K5D, which removes the short from the high-voltage output of the power supply.

The input to the high-voltage power supply is energized and the high voltage ON lamp I1 is lit by contacts K5B and K5C.

4.2.4.7 Fault relay K16 is placed in the breakdown fault circuit by closed relay contacts K23C
by readying it for operation.

4.2.4.8 Breakdown fault to sheath circuit is made ready for operation by opened relay contacts K23A.

4.2.4.9 Manual retest discharge control relay K24 is latched by closed relay contacts K23B.

4.2.4.10 The circuit to the manual retest discharge timer MT4A and Horn is made ready
to operate on discharge
by closed relay contacts K24A.
4.2.4.11 The stepping switch self-interrupting
retest position circuit is disabled
by opened relay contacts K24B
This prevents the set from being brought
to the next position for manual retest,
until the tested position has been discharged.
4.2.4.12 The test terminal relay X corresponding to the position under test, as selected by stepping switch level S4–1 will energize
by closed relay contacts K24C
Thus the conductor connected to the terminal under test will be removed from ground and placed on the high-voltage output of the power supply.
4.2.4.13 Slowly increase the voltage control from its zero position.
Voltage will now be applied to the cable conductor, slowly increasing in value from zero.
The voltage control cam-operated switches S14 will be operated in sequence, thereby placing the proper current limiting resistance R3 in the high-voltage output of the power supply. This maintains the current, drawn from the power supply under fault conditions, fairly constant regardless of the voltage.
4.2.4.14 When the conductor breaks down
the fault current flowing through the breakdown fault circuit will energize relay K16.
If the breakdown is to the metallic sheath, the sheath fault lamp I3 in the breakdown fault to sheath circuit will light.
The reading on the voltmeter M1 will drop.
4.2.4.15 The fault memory pulse relay K19 will energize
by closed relay contacts K16A.
Open relay contacts K22F will prevent it from locking-in through its contacts K19D.
Open relay contacts K22E will prevent the MT3 timer start relay K17 from being latched by relay contacts K19C.
4.2.4.16 A 115 volt DC pulse will be applied to the fault position display neon lamp associated with the terminal under test, by the position of stepping switch level S4–3
by closed relay contacts K19A and opened relay contacts K19B.
The fault position neon display lamp will light and be held lighted by the 65 v. DC holding voltage.
Thus an indication of the faulted terminal will be maintained.
4.2.4.17 Thus when the breakdown is first noted as the voltage is slowly increased:
the voltage control is stopped at this position.
The breakdown voltage is noted on Voltmeter M1 and recorded.
It is also ascertained whether the breakdown is to the metallic sheath, since no such failures are tolerated in the cable.
The high voltage ON manual retest pushbutton S10 is released.
4.2.4.18 The high voltage ON manual retest relay K23 is de-energized
by the high voltage ON manual retest switch contacts S10–1.
The high voltage ON contactor K5 is de-energized by opened relay contacts K23D, which de-energizes the input to the high-voltage power supply and extinguishes the high voltage ON lamp I1.
Ground relay Y1 is de-energized by opened contacts K5D, which grounds the conductor just tested through its associated test terminal relay X contacts, ground relay Y1 contacts and resistor R4.
Thus the conductor now starts to discharge.
The breakdown fault circuit is disabled by opened relay contacts K23C, thus de-energizing relay K19 and preventing the breakdown fault relay K16 from being actuated by the discharge current.
The breakdown fault to sheath circuit is disabled by closed relay contacts K23A, thus extinguishing the sheath-fault lamp, if lit, and preventing it from operating by the discharge current.
The 115 v. DC firing voltage will be removed from the capacitor C7, by opened relay contacts K19A. This capacitor will be discharged, by closed relay contacts K19B, thus readying it for operation on the next position to be tested.
4.2.4.19 The manual retest discharge timer MT4 and Horn are energized
by the high voltage ON manual retest switch contacts S10–2, through closed relay contacts K24A.
This timer is adjustable and set to provide a timing interval of 2 seconds, at the end of which its contacts MT4A operate. This time interval is sufficient to completely discharge the cable conductors after test.
The horn provides an audible signal, that the conductor is being discharged and not to proceed to the next test position, until the discharge interval is completed, when the signal stops.
4.2.4.20 During the discharge interval
The horn sounds
The test terminal relay X corresponding to the position of the stepping switch level S4–1, is kept energized by closed relay contacts K24C. Thus the conductor is kept connected to ground through the closed test terminal relay X contacts, closed ground relay Y1 contacts and resistor R4.
The stepping switch self-interrupting retest position circuit is kept disabled, by opened relay contacts K24B. Thus the stepping switch S4 cannot be moved from this position until the end of the discharge interval.
4.2.4.21 At the end of the discharge interval, MT4 timer has timed out and its contacts MT4A operate, which resets relay K24.
The horn stops sounding and MT4 timer is de-energized by opened contacts K24A. Thus the timer is reset to its initial position.
The test terminal relay X, corresponding to the existing position is de-energized, by opened relay contacts K24C. Thus the conductor is removed from the shorted high-voltage output and replaced on the test terminal ground through the corresponding resistor R5.
The stepping switch self-interrupting retest position circuit is made continuous up to the next retest position, by closed relay contacts K24B. The stepping switch can now be brought to this position for manual retest.

4.2.4.22 After all the faulted conductors have been manually retested as outlined above in sections 4.2.3 and 4.2.4,
- the stepping switch S4 will be back to its zero position.
- Home position relay K1 will be energized.
- The voltage control is brought back to its zero position.
- Reset for automatic test by depressing the reset pushbutton S12. The manual retest relay K22 will reset through closed relay contacts K1C. The manual retest lamp I10 will extinguish. Thus the manual retest relay K22 cannot be reset unless the stepping switch S4 is back at its home position.

(5) *Stopping during automatic testing*

To stop the operation of the set while the automatic test cycle is in progress on a test position, depress the auto test stop pushbutton S7. The conductor connected to this position would not be subjected to the full test voltage for the required time interval unless the auto test stop pushbutton is depressed during the discharge cycle. Therefore when automatic testing is resumed after it was stopped at a given position, the test cycle will be repeated on this position before proceeding to the next position.

5.1 Auto test stop pushbutton S7 depressed while the automatic test cycle is in progress.
   5.1.1 The auto test stop relay K4 will de-energize. It will be maintained in this state by its opened contacts K4A.
   5.1.2 The high voltage ON contactor K5 will be de-energized if not already in this state and will be maintained de-energized during the remainder of the test cycle
      by opened relay contacts K4E
      Thus if the input to the high-voltage power supply has been energized, it will de-energize and the high voltage ON lamp I1 will extinguish by opened contacts K5B and K5C.
   5.1.3. The breakdown fault circuit and the breakdown fault to sheath circuit will be disabled if not already in this condition
      by opened relay contacts K15A and K15B because closed relay contacts K4F will reset relay K15.
      Thus they will be prevented from operating by the discharge current.
   5.1.4. The ground relay Y1 will de-energize if not already in this state and will be maintained de-energized during the remainder of the test cycle because closed relay contact K4F resets relay K9, opening its contacts K9A.
      Thus the conductor under test, which has been placed on the high-voltage output of the power supply at the beginning of the test cycle, will remain in this condition and will be grounded through its corresponding test terminal relay X contacts, through the ground relay Y1 contacts and resistor R4.
      Therefore if voltage has already been applied to the conductor, it will discharge during the remainder of the test cycle, through the energized test terminal relay contacts. These contacts will not switch over during the discharge current flow.
   5.1.5 The test cycle on each position consists basically of three stages. The charging cycle controlled by timer MT1, the test voltage dwell time controlled by timer MT2, and the discharge cycle controlled by timer MT3.
      If the operation of the set is stopped during any one of these stages, the controlling timer will return to its initial start position and the test cycle will be prevented from proceeding to the next stage.
      5.1.5.1 Timers MT1, MT2, and MT3 are stopped and prevented from initiating the succeeding timer operation
         by opened relay contacts K4B.
         However they are allowed to return to their initial start position.
   5.1.6 The operation of the charging cycle breakdown timer MT5, is prevented from being initiated by MT1 timer switch contacts MT1G; or if already initiated will be immediately reset to its original position
      by opened relay contacts K4H which also opens the circuit to relay K15 latch coil, thus allowing relay K15 to be reset by closed relay contacts K4F.
   5.1.7 The MT3 timer switch contacts MT3F are prevented from stepping the set to the next position and initiating a new test cycle
      by opened relay contacts K4C.
      Thus the test cycle will stop at the existing position.
   5.1.8 The position retest relay K20 will be latched
      by closed relay contacts K4G through closed relay contacts K1D.

5.2 To continue the automatic test, simply depress the "ready" pushbutton S2, then depress the "start auto test" pushbutton S3.
   5.2.1 The actuation of the "ready" pushbutton S2 will reset those relays which have not been reset, when the automatic test cycle was stopped
      by the contacts of reset relay K2.
      However the open relay contacts K1C will prevent the position retest relay K20 from being reset.
      Thus these relays will be ready to perform their required function in the resumed automatic test cycle.
   5.2.2 The stepping switch step circuit however will be open
      by opened relay contacts K20A.
      Therefore the stepping switch S4 will not step to the next position. Thus the existing position would be tested again.
      If the set has been stopped at the last test position opened relay contacts K20B will prevent the set from automatically stepping back to its home position before it is tested again.
   5.2.3 As the test cycle is performed on the existing position
      MT1 Timer switch contacts MT1C will reset relay K20, which would enable the set to step to the next position at the end of the test cycle.
   5.2.4 In this manner the set will again test the position, at which it was stopped, and continue testing the remaining positions.

(6) *Interruption of control power during automatic testing*

If the control power is interrupted while the cable conductors are being automatically tested, the display of any faulted conductors in the fault memory circuit will be wiped out; because the holding voltage of the fault position memory display lamps will have been interrupted. It would therefore be necessary for all the positions to be tested again.

6.1 When the control power is interrupted while the automatic test is in progress
   6.1.1 the holding voltage of the fault position memory display lamps will be interrupted.
      The display of any faulted conductors in the fault memory circuit will extinguish.

6.1.2 The control power ON relay K3 will de-energize.
   It will be maintained in this state by its opened relay contact K3A.
6.1.3 The auto test stop relay K4 will de-energize.
   It will be maintained in this state by its opened relay contact K4A and opened relay contact K3B.
6.1.4 The high voltage ON contactor K5 will be de-energized if not already in this state.
   It will be maintained de-energized by opened relay contact K4E.
   Thus if the input to the high-voltage power supply has been energized, it will de-energize and will be maintained de-energized, upon restoration of the control power, by opened contactor contacts K5B and K5C.
6.1.5 The ground relay Y1 will de-energize if not already in this state.
   It will be maintained de-energized by opened relay contacts K3C.
6.1.6 The test terminal relay X corresponding to the position at which the control power was removed will de-energize.
   Thus if voltage has been applied to the conductor connected to this position, it will discharge through the test terminal relay X contacts and the corresponding resistor R5.
   It will be maintained de-energized, upon restoration of the control power, by opened relay contact K3C.
6.2 Control Power restores after being interrupted.
   6.2.1 The timer controlling the test cycle stage at which power was interrupted will return to its initial start position.
      However the timers controlling the succeeding stages will be prevented from starting, by opened relay contacts K4B and K4C.
   6.2.2 The stepping switch S4 will immediately step rapidly back to its home position.
      by closed relay contacts K3D.
      If relay K8 was latched before the power was interrupted, then its contacts K8B will still be closed. Therefore opened contacts K3C will prevent the test terminal relays X1 to X50, from making and breaking by the stepping switch level S4–1, as it is stepped back to home.
      Opened relay contacts K1F prevents relays K3 and K4 from being energized by the "ready" pushbutton S2, before the stepping switch S4 has reached its home position.
   6.2.3 The control power was off lamp I11 will light by closed relay contacts K3E.
   6.2.4 Repeat the automatic test on all conductors connected to the test terminals as outlined in section 1.5; section 3, starting from 3.5.

I claim:
1. An automatic cable test set for detecting high voltage insulation failures in multiple conductor metal sheathed electrical cables comprising, a variable source of high voltage direct current having an output voltage between a grounded terminal and an ungrounded terminal of at least several thousand volts, a high voltage bus connected to said ungrounded terminal, a plurality of test terminals to which selected conductors of a cable under test may be connected, one of said test terminals being adapted for connection to the metallic sheath of said cable, a high voltage vacuum relay associated with each test terminal, each said relay having an actuating coil, a movable contact and a pair of fixed contacts, all of said contacts being in an evacuated space, one of said fixed contacts being connected to said movable contact when said relay is de-energized, said movable contact of each relay being connected to the associated test terminal, said one fixed contact of each relay being connected to the grounded side of said high voltage supply through a resistor, the other fixed contact of each relay being connected to said high voltage bus, means for sequentially energizing the actuating coils of said high voltage vacuum relays to connect each of said conductors sequentially to said high voltage bus, to test without interruption due to a fault on a conductor all terminals to which cable conductors are connected, means responsive to said means for sequentially energizing the actuating coils of said high voltage relays for grounding said high voltage bus except when a conductor is under test, means in series with said grounded terminal of said high voltage source for detecting currents flowing in a conductor under test after the voltage on said conductor has reached a predetermined value, means in series with the sheath of said cable for detecting faults between a conductor under test and the sheath of said cable for giving an indication of a fault to said sheath, and means for storing and displaying the designation of test terminals connected to conductors in which fault currents flow under test.

2. Apparatus according to claim 1, including a voltage sensing circuit to sense the voltage on said high voltage bus and to provide an output when a predetermined high voltage has been reached, thereby to condition said means for detecting fault currents to operate when a fault current flows.

3. Apparatus according to claim 1 wherein the means connecting said high voltage bus to the ungrounded terminal of the high voltage source includes a plurality of resistors connected in series to said high voltage bus and to said ungrounded terminal, a plurality of high voltage vacuum relays having an operating coil and a pair of contacts which close when said operating coil is energized, the contacts of said vacuum relays being connected to short across certain of said resistors, the operation of said relays being controlled by a plurality of cam operated switches, the rotation of said cams being coupled to the variable control of said high voltage source whereby as the output voltage of said high voltage source is increased the total resistance in series with the ungrounded terminal of said source also increases and the maximum current drawn from said high voltage supply when said high voltage bus is shorted is limited to the maximum safe output of said high voltage source.

4. Apparatus according to claim 2 including a charging interval timer to provide an output a predetermined time after charging of a conductor commences, and if said voltage sensing circuit has not operated, to energize the fault position display to indicate a fault on the conductor under test.

5. Apparatus according to claim 1 including a test duration timer to maintain the test voltage on a conductor under test for a predetermined time.

6. Apparatus according to claim 4 including a discharge timer and a test duration timer, said test duration timer controlling the interval during which the test voltage is maintained on a conductor under test, said discharge timer controlling the shorting of said high voltage bus, the disconnection of a test terminal from the high voltage bus by the high voltage vacuum relay, the connection of a succeeding terminal to the high voltage bus, the removal of the short from the high voltage bus and the operation of the charging interval timer.

References Cited

UNITED STATES PATENTS

| | | | |
|---|---|---|---|
| 2,805,391 | 9/1957 | Meadows et al. | 324—54 |
| 2,925,553 | 2/1960 | Shillington | 324—54 |
| 3,287,633 | 11/1966 | Mollo | 324—54 XR |
| 3,323,701 | 6/1967 | Gurski et al. | 324—54 XR |

RUDOLPH V. ROLINEC, *Primary Examiner.*

GERARD R. STRECKER, *Assistant Examiner.*